United States Patent
Watanabe

(10) Patent No.: US 12,465,901 B2
(45) Date of Patent: Nov. 11, 2025

(54) METHOD FOR PRODUCING HOLLOW PARTICLES

(71) Applicant: ZEON CORPORATION, Tokyo (JP)

(72) Inventor: Masashi Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 298 days.

(21) Appl. No.: 18/027,676

(22) PCT Filed: Sep. 28, 2021

(86) PCT No.: PCT/JP2021/035538
§ 371 (c)(1),
(2) Date: Mar. 22, 2023

(87) PCT Pub. No.: WO2022/071276
PCT Pub. Date: Apr. 7, 2022

(65) Prior Publication Data
US 2023/0381731 A1 Nov. 30, 2023

(30) Foreign Application Priority Data
Sep. 30, 2020 (JP) .................................. 2020-165179

(51) Int. Cl.
*B01J 13/18* (2006.01)
*B01J 13/20* (2006.01)
(Continued)

(52) U.S. Cl.
CPC ........... *B01J 13/185* (2013.01); *B01J 13/206* (2013.01); *C08F 222/102* (2020.02);
(Continued)

(58) Field of Classification Search
CPC ................ B01J 13/14; C08F 6/24; C08F 2/18
(Continued)

(56) References Cited

U.S. PATENT DOCUMENTS

| 2005/0154088 A1* | 7/2005 | Miura ................... G03G 9/0804 430/110.3 |
| 2019/0194415 A1* | 6/2019 | Tayagaki ................. B01J 13/18 |
| 2021/0087349 A1* | 3/2021 | Iga ......................... B01J 13/203 |

FOREIGN PATENT DOCUMENTS

| JP | 2002-080503 A | 3/2002 |
| JP | 2016-068037 A | 5/2016 |

(Continued)

OTHER PUBLICATIONS

Notification of Transmittal of Translation of the International Preliminary Report on Patentability (Form PCT/IB/338) issued in counterpart International application No. PCT/JP2021/035538 mailed Apr. 13, 2023 with Forms PCT/IB/373 and PCT/ISA/237. (5 pages).

*Primary Examiner* — Alison L Hindenlang
*Assistant Examiner* — Debjani Roy
(74) *Attorney, Agent, or Firm* — WHDA, LLP

(57) ABSTRACT

A method for producing hollow particles, the method comprising: preparing a mixture liquid containing a first polymerizable monomer, a hydrocarbon solvent, a dispersion stabilizer and an aqueous medium, suspending the mixture liquid to prepare a suspension in which droplets of a monomer composition containing the first polymerizable monomer and the hydrocarbon solvent are dispersed in the aqueous medium, and subjecting the suspension to a polymerization reaction, wherein the mixture liquid contains a crosslinkable monomer as the first polymerizable monomer in an amount of 75 to 100 parts by mass per 100 parts by mass of the first polymerizable monomer, and wherein, during the polymerization reaction, when a polymerization conversion rate of the first polymerizable monomer reaches 93% by mass or more, a second polymerizable monomer having a solubility of 0.3 g/L or more in distilled water at 20° C., is added to the suspension and further subjected to the polymerization reaction.

10 Claims, 2 Drawing Sheets

(51) Int. Cl.
  *C08F 222/10*    (2006.01)
  *C08L 35/02*    (2006.01)
(52) U.S. Cl.
  CPC .......... *C08L 35/02* (2013.01); *C08F 2800/20* (2013.01); *C08F 2810/20* (2013.01)
(58) Field of Classification Search
  USPC ......................................................... 521/65
  See application file for complete search history.

(56) References Cited

FOREIGN PATENT DOCUMENTS

JP     2016-190980 A    11/2016
WO    WO-2019026899 A1 *  2/2019  .............. B01J 13/14

* cited by examiner

METHOD FOR PRODUCING HOLLOW PARTICLES

TECHNICAL FIELD

The present disclosure relates to a method for producing hollow particles.

BACKGROUND ART

Hollow particles (hollow resin particles) are particles each of which has a hollow in its inside, and they can scatter light well and can reduce light transmissivity as compared to solid particles in which their interiors are practically filled with resin; hence, hollow particles are widely used in the applications of, for example, aqueous coating materials and paper coating compositions, as organic pigments and masking agents excellent in optical properties such as opacity and whiteness. Also, hollow particles are used as weight reducing materials, heat insulation materials or the like for resins and coating materials, which are used in various kinds of fields such as the automotive field, the electronic field, the electric field and the architecture field.

Hollow particles are desired to keep a high void ratio when kneaded with other materials and even when molded into a molded body after kneading, in order to improve effects such as weight reduction, heat insulation, opacification and whitening of various kinds of compositions and molded bodies which are mixed with hollow particles. However, when the void ratio of the hollow particles is increased, there are problems in that the shell thickness of the hollow particles is decreased, and the hollow particles easily collapse. Accordingly, hollow particles which have a high void ratio and which are less likely to collapse, are needed.

Patent Literature 1 discloses a method for producing hollow resin particles, which is characterized in that a mixed solution containing a monomer mixture, which contains 20 to 70 parts by weight of a polyfunctional monomer having two or more ethylenically unsaturated groups and 80 to 30 parts by weight of a monofunctional monomer, a non-reactive organic solvent, and a non-crosslinkable polymer having a polystyrene equivalent weight average molecular weight of 10000 to 1000000, is dispersed in an aqueous solution containing a dispersion stabilizer or a surfactant, and then the solution is polymerized. Patent Literature 1 mentions that hollow resin particles which have a small grain size, which have fewer pin holes and which have less collapses, are provided by the production method.

Patent Literature 2 discloses hollow resin particles such that the particles have one hollow enclosed by a shell and a thermal decomposition initiation temperature of 350° C. or higher, and the shell has a fine through hole having a diameter in the range of 10 nm to 50 nm and has a thickness of the ratio of 0.03 to 0.25 with respect to the average primary particle diameter of the hollow resin particles. Also, Patent Literature 2 mentions that the hollow resin particles are produced by dispersing a mixed solution containing a polyfunctional monomer and a non-reactive solvent in an aqueous solution, and then polymerizing the polyfunctional monomer.

Patent Literature 3 discloses a method for producing hollow polymer fine particles comprising a shell of single layer structure and a hollow portion, in which a mixture of (i) at least one crosslinkable monomer (B) or a mixture of at least one crosslinkable monomer (B) and at least one monofunctional monomer (B'), (ii) an initiator (C) and (iii) a sparingly water-soluble solvent (D) having low compatibility with a polymer or copolymer obtained from the at least one crosslinkable monomer (B) or a copolymer of the at least one crosslinkable monomer (B) and the at least one monofunctional monomer (B') is dispersed in an aqueous solution of a dispersion stabilizer (A), followed by suspension polymerization.

CITATION LIST

Patent Literatures

[Patent Literature 1] Japanese Patent Application Laid-Open (JP-A) No. 2016-68037
[Patent Literature 2] JP-A No. 2016-190980
[Patent Literature 3] JP-A No. 2002-80503

SUMMARY OF INVENTION

Technical Problem

However, the hollow resin particles of Patent Literature 1 have the following problem: when a coating material or molding material is produced by mixing the hollow resin particles with a resin, or when a molded body is produced by use of the molding material containing the hollow resin particles, the hollow resin particles cannot sufficiently withstand the shear or pressure of biaxial kneading or injection molding, and they are likely to collapse, accordingly.

Like the hollow resin particles of Patent Literature 1, the hollow resin particles of Patent Literature 2 have a problem in that they cannot sufficiently withstand the shear or pressure of biaxial kneading or injection molding, and they are likely to collapse, accordingly. In addition, the hollow resin particles of Patent Literature 2 have the following problem: due to the fine through hole, the resin enters the interior of the particles during injection molding of a molding resin composition containing the hollow resin particles. In addition, while the fine through hole of the hollow resin particles imparts beneficial functions to the hollow resin particles, since the fine through hole is a defect portion of the shell, it decreases the strength of the hollow resin particles and causes the collapse of the hollow resin particles.

Compared to the hollow resin particles of Patent Literatures 1 and 2, the hollow resin particles of Patent Literature 3 are less likely to collapse. However, the hollow resin particles of Patent Literature 3 have a problem in that they are deformed by the shear or pressure of biaxial kneading or injection molding and cause a decrease in void ratio.

An object of the present disclosure is to provide a method for producing hollow particles which have a high void ratio and which are less likely to collapse.

Solution to Problem

The inventor of the present disclosure found that in the method for obtaining hollow particles by suspension polymerization, an effective way to produce hollow particles which have a high void ratio and which are less likely to collapse, is such that when the polymerization conversion rate of the first polymerizable monomer containing a large amount of crosslinkable monomer reaches a specific value or more, the second polymerizable monomer which is a hydrophilic monomer is added and the polymerization reaction is continued.

The present disclosure provides a method for producing hollow particles which comprise a shell containing a resin and a hollow portion surrounded by the shell and which have a void ratio of 50 or more, the method comprising:
preparing a mixture liquid containing a first polymerizable monomer, a hydrocarbon solvent, a dispersion stabilizer and an aqueous medium,
suspending the mixture liquid to prepare a suspension in which droplets of a monomer composition containing the first polymerizable monomer and the hydrocarbon solvent are dispersed in the aqueous medium, and
subjecting the suspension to a polymerization reaction,
wherein the mixture liquid contains a crosslinkable monomer as the first polymerizable monomer, and in 100 parts by mass of the first polymerizable monomer, a content of the crosslinkable monomer is from 75 parts by mass to 100 parts by mass, and
wherein, during the polymerization reaction of the suspension, when a polymerization conversion rate of the first polymerizable monomer reaches 93% by mass or more, a second polymerizable monomer having a solubility of 0.3 g/L or more in distilled water at 20° C., is added to the suspension and further subjected to the polymerization reaction.

In the method for producing the hollow particles according to the present disclosure, during the polymerization reaction of the suspension, an amount of the second polymerizable monomer added is preferably from 3 parts by mass to 15 parts by mass, with respect to 100 parts by mass of the first polymerizable monomer.

In the method for producing the hollow particles according to the present disclosure, the first polymerizable monomer preferably contains, as the crosslinkable monomer, a bifunctional crosslinkable monomer and a trifunctional or higher-functional crosslinkable monomer.

In the method for producing the hollow particles according to the present disclosure, the first polymerizable monomer preferably contains, as the crosslinkable monomer, a trifunctional or higher-functional crosslinkable monomer having three or more polymerizable functional groups, and in 100 parts by mass of the first polymerizable monomer, a content of the trifunctional or higher-functional crosslinkable monomer is preferably from 5 parts by mass to 50 parts by mass.

In the method for producing the hollow particles according to the present disclosure, the first polymerizable monomer preferably contains, as the crosslinkable monomer, at least one bifunctional crosslinkable monomer selected from the group consisting of divinylbenzene, ethylene glycol di(meth)acrylate and pentaerythritol di(meth)acrylate.

In the method for producing the hollow particles according to the present disclosure, the first polymerizable monomer preferably contains, as the crosslinkable monomer, at least one trifunctional or higher-functional crosslinkable monomer selected from the group consisting of pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate and dipentaerythritol poly(meth)acrylate.

In the method for producing the hollow particles according to the present disclosure, the mixture liquid preferably contains at least one selected from the group consisting of rosin acids, higher fatty acids and metal salts thereof.

In the method for producing the hollow particles according to the present disclosure, the dispersion stabilizer is preferably an inorganic dispersion stabilizer, and the inorganic dispersion stabilizer is preferably a sparingly water-soluble metal salt.

Advantageous Effects of Invention

According to the production method of the present disclosure, hollow particles which have a high void ratio and which are less likely to collapse, are produced. In particular, hollow particles which are less likely to collapse when mixed and kneaded with other materials such as resin, are produced.

BRIEF DESCRIPTION OF DRAWINGS

In the accompanying drawings.

DESCRIPTION OF EMBODIMENTS

Figure 1:
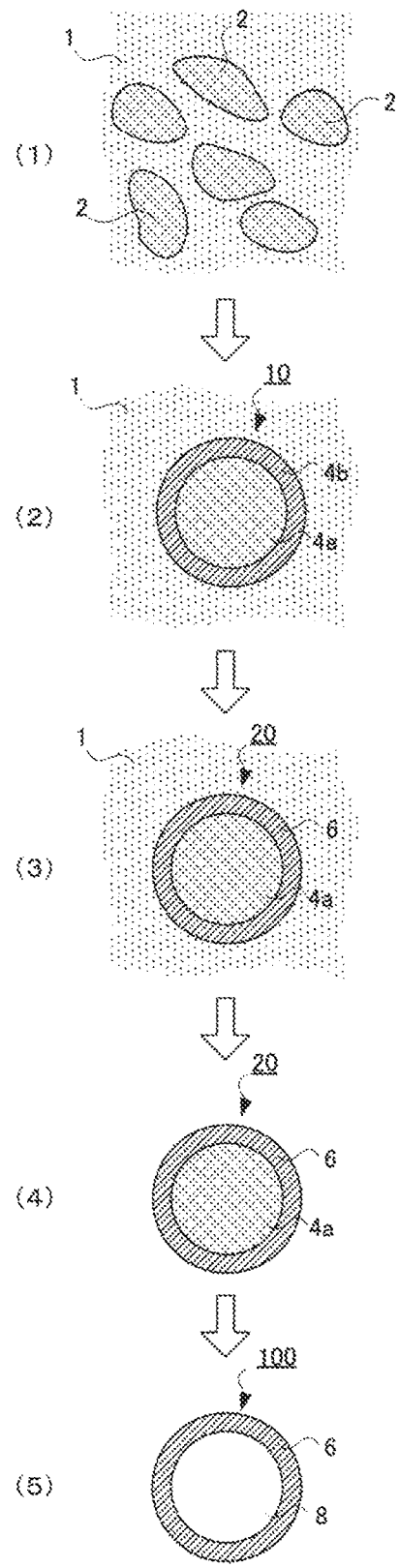
FIG. 1 is a diagram illustrating an example of the production method of the present disclosure.

In the present disclosure, "A to B" in a numerical range is used to describe a range in which the numerical value A is included as the lower limit value and the numerical value B is included as the upper limit value.

Also in the present disclosure, (meth)acrylate means each of acrylate and methacrylate; (meth)acryl means each of acryl and methacryl; and (meth)acryloyl means each of acryloyl and methacryloyl.

Also in the present disclosure, the term "polymerizable monomer" means a compound having an addition-polymerizable functional group (in the present disclosure, it may be simply referred to as a "polymerizable functional group"). Also in the present disclosure, as the polymerizable monomer, a compound having an ethylenically unsaturated bond as the addition-polymerizable functional group, is generally used.

There are two types of polymerizable monomers: a non-crosslinkable monomer and a crosslinkable monomer. The non-crosslinkable monomer is a polymerizable monomer which has only one polymerizable functional group, and the crosslinkable monomer is a polymerizable monomer which has two or more polymerizable functional groups and which forms crosslinking in resin by a polymerization reaction.

In the present disclosure, a polymerizable monomer having a solubility of 0.3 g/L or more in distilled water at 20° C. is referred to as a "hydrophilic monomer", and a polymerizable monomer having a solubility of less than 0.3 g/L in distilled water at 20° C. is referred to as a "non-hydrophilic monomer".

The hollow particles obtained by the production method of the present disclosure are particles which comprise a resin-containing shell (outer shell) and a hollow portion surrounded by the shell.

In the present disclosure, the term "hollow portion" means a hollow space clearly distinguished from the shell of hollow particles formed from a resin material. The shell of the hollow particles may have a porous structure. In this case, the hollow portion has a size that can be clearly distinguished from many minute spaces uniformly dispersed in the porous structure.

The hollow portion of the hollow particles can be determined by, for example, SEM observation of a cross section of the particles or TEM observation of the particles as they are.

The hollow portion of the hollow particles may be filled with gas such as air, may be in a vacuum or reduced pressure state, or may contain a solvent.

Hereinafter, the method for producing the hollow particles according to the present disclosure and the hollow particles obtained by the production method of the present disclosure, will be described in detail.

1. Method for Producing Hollow Particles

The method for producing the hollow particles according to the present disclosure, is a method for producing hollow particles which comprise a shell containing a resin and a hollow portion surrounded by the shell and which have a void ratio of 50% or more, the method comprising:
preparing a mixture liquid containing a first polymerizable monomer, a hydrocarbon solvent, a dispersion stabilizer and an aqueous medium,
suspending the mixture liquid to prepare a suspension in which droplets of a monomer composition containing the first polymerizable monomer and the hydrocarbon solvent are dispersed in the aqueous medium, and
subjecting the suspension to a polymerization reaction,
wherein the mixture liquid contains a crosslinkable monomer as the first polymerizable monomer, and in 100 parts by mass of the first polymerizable monomer, a content of the crosslinkable monomer is from 75 parts by mass to 100 parts by mass, and
wherein, during the polymerization reaction of the suspension, when a polymerization conversion rate of the first polymerizable monomer reaches 93% by mass or more, a second polymerizable monomer having a solubility of 0.3 g/L or more in distilled water at 20° C., is added to the suspension and further subjected to the polymerization reaction.

The method for producing the hollow particles according to the present disclosure follows the following basic technique: by carrying out the suspension treatment of the mixture liquid containing the first polymerizable monomer, the hydrocarbon solvent, the dispersion stabilizer, and the aqueous medium, phase separation is caused between the first polymerizable monomer and the hydrocarbon solvent. Accordingly, the suspension in which droplets are dispersed in the aqueous medium, and the droplets having a distribution structure such that the first polymerizable monomer is distributed on the surface side and the hydrocarbon solvent is distributed in the center, is prepared. By subjecting the suspension to a polymerization reaction, the surface of the droplets is cured to form the hollow particles having the hollow portion filled with the hydrocarbon solvent.

According to this basic technique, during the polymerization reaction of the suspension, when the polymerization conversion rate of the first polymerizable monomer containing the crosslinkable monomer reaches 93% by mass or more, the second polymerizable monomer, which is a hydrophilic monomer, is added to the suspension, and the suspension is further subjected to the polymerization reaction. Accordingly, hollow particles which have a high void ratio and which are less likely to collapse, are produced.

By using a large amount of the crosslinkable monomer as a polymerizable monomer that is used to form the shell of the hollow particles, the content of the crosslinkable monomer unit in the shell is increased, and the covalent bond network is more tightly strung in the shell. As a result, the shell which is excellent in strength, which is less likely to collapse, and which is less likely to deform even when heat or the like is applied from the outside, is formed. However, when a large amount of the crosslinkable monomer is used, unreacted polymerizable functional groups are likely to remain in the shell. As the number of the polymerizable functional groups remaining unreacted in the shell increases, the crosslinked structure of the shell becomes looser. Accordingly, the strength of the shell tends to decrease. Therefore, the unreacted polymerizable functional groups remaining in the hollow particles obtained by the conventional production method, are considered to contribute to a decrease in the shell strength.

Meanwhile, in the production method of the present disclosure, the reaction rate of the whole polymerizable monomers including the first and second polymerizable monomers, is considered to be increased by the following polymerization reaction of the suspension: the suspension in which the droplets of the monomer composition containing the first polymerizable monomer are dispersed in the aqueous medium, the first polymerizable monomer containing a large amount of the crosslinkable monomer, is subjected to the first polymerization reaction until the polymerization conversion rate of the first polymerizable monomer reaches 93% by mass or more; then, the second polymerizable monomer which is a hydrophilic monomer, is added to the suspension; and the suspension is further subjected to the second polymerization reaction.

In the present disclosure, the particles having the hollow portion filled with the hydrocarbon solvent and the shell containing the polymer of the first polymerizable monomer obtained by the first polymerization reaction, may be referred to as the "first precursor particles", and the composition containing the first precursor particles may be referred to as the first precursor composition. Also in the present disclosure, the particles having the hollow portion filled with the hydrocarbon solvent and the shell containing the polymer of the first and second polymerizable monomers, may be considered as the intermediate of the hollow particles in which the hollow portion is filled with gas, and they may be referred to as the "second precursor particles". The composition containing the second precursor particles may be referred to as the second precursor composition.

In the production method of the present disclosure, the second polymerizable monomer is likely to be incorporated into the shell of the first precursor particles when added to the first precursor composition, because the solubility of the second polymerizable monomer in distilled water at 20° C. is equal to or more than the above-specified value. The second polymerizable monomer is considered to be incorporated into the shell formed by the first polymerizable monomer and accelerate the thermal motion of the shell when added to the first precursor composition, because the second polymerizable monomer is a hydrophilic monomer and has affinity for both the first polymerizable monomer and the aqueous medium. The reason for the formation of the shell having excellent strength, is presumed to be as follows. In the second polymerization reaction, the polymerization reaction progresses while the thermal motion of the shell is accelerated in the state where the second polymerizable monomer is incorporated in the shell formed by the first polymerizable monomer. Accordingly, the reaction rate is high; the polymerization reaction of the second polymerizable monomer incorporated in the shell and the polymerization reaction of the polymerizable functional groups of the first polymerizable monomer remaining unreacted in the shell, sufficiently progress; and the crosslinked structure is densified.

The method for producing the hollow particles according to the present disclosure includes the steps of preparing the mixture liquid, preparing the suspension, and subjecting the suspension to the polymerization reaction. The method may further include other steps. As far as technically possible, two or more of the above steps and other additional steps may be simultaneously carried out as one step, or their order may be changed and then they may be carried out in that order. For example, the preparation and suspension of the mixture liquid may be simultaneously carried out in one step (e.g., the mixture liquid may be suspended while adding the materials for the mixture liquid).

A preferred embodiment of the method for producing the hollow particles according to the present disclosure, may be a production method including the following steps.

(1) Mixture Liquid Preparation Step

The mixture liquid preparation step includes preparing the mixture liquid containing the first polymerizable monomer, the hydrocarbon solvent, the dispersion stabilizer, and the aqueous medium.

(2) Suspension Step

The suspension step includes suspending the mixture liquid to prepare the suspension in which the droplets of the monomer composition containing the first polymerizable monomer and the hydrocarbon solvent are dispersed in the aqueous medium.

(3) Polymerization Step (3-1) First Polymerization Step

The first polymerization step includes performing the first polymerization reaction by subjecting the suspension to a polymerization reaction, until the polymerization conversion rate of the first polymerizable monomer reaches 93% by mass or more to prepare the first precursor composition containing the first precursor particles that have the shell containing the polymer of the first polymerizable monomer and the hollow portion filled with the hydrocarbon solvent.

(3-2) Second Polymerization Step

The second polymerization step includes performing the second polymerization reaction by adding, to the first precursor composition, the second polymerizable monomer having a solubility of 0.3 g/L or more in distilled water at 20° C. and subjecting the composition to the polymerization reaction to prepare the second precursor composition containing the second precursor particles that have the shell containing the polymer of the first and second polymerizable monomers and the hollow portion filled with the hydrocarbon solvent.

(4) Solid-Liquid Separation Step

The solid-liquid separation step includes carrying out solid-liquid separation of the second precursor composition to obtain the second precursor particles including the hydrocarbon solvent in the hollow portion.

(5) Solvent Removal Step

The solvent removal step includes removing the hydrocarbon solvent from the second precursor particles obtained by the solid-liquid separation step to obtain the hollow particles.

FIG. 1 is a schematic diagram showing an example of the production method of the present disclosure. The diagrams (1) to (5) in FIG. 1 correspond to the steps (1) to (5) described above, respectively. White arrows between the diagrams indicate the order of the steps. FIG. 1 is merely a schematic diagram for description, and the production method of the present disclosure is not limited to the method shown in FIG. 1. Further, the structures, dimensions and shapes of materials used for the production methods of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is less likely to mix with the aqueous medium 1. In the present disclosure, the low polarity material 2 contains the first polymerizable monomer and the hydrocarbon solvent.

The diagram (2) of FIG. 1 is a schematic cross-sectional view showing an embodiment of the suspension in the suspension step. The suspension contains the aqueous medium 1 and a droplet 10 of the monomer composition dispersed in the aqueous medium 1. The droplet 10 of the monomer composition contains the first polymerizable monomer and the hydrocarbon solvent; however, their distribution in the droplet is not uniform. The droplet 10 of the monomer composition has the following structure: phase separation occurs between the hydrocarbon solvent (hydrocarbon solvent 4a) and a material 4b containing the first polymerizable monomer and not containing the hydrocarbon solvent; the hydrocarbon solvent 4a is distributed in the center; the material 4b not containing the hydrocarbon solvent is distributed on the surface side; and the dispersion stabilizer (not shown) is on the surface.

The diagram (3) of FIG. 1 is a schematic cross-sectional view showing an embodiment of the composition (the second precursor composition) which is obtained by the polymerization step and which contains the hollow particle (the second precursor particle) including the hydrocarbon solvent in the hollow portion. The composition contains the aqueous medium 1 and a hollow particle 20 (the second precursor particle) which is dispersed in the aqueous medium 1 and which includes the hydrocarbon solvent 4a in the hollow portion. A shell 6 forming the outer surface of the second precursor particle 20 is formed by polymerization of the first polymerizable monomer in the droplet 10 of the monomer composition and polymerization of the second polymerizable monomer added later.

The diagram (4) of FIG. 1 is a schematic cross-sectional view showing an embodiment of the hollow particle including the hydrocarbon solvent in the hollow portion (the second precursor particle) after the solid-liquid separation step. The diagram (4) of FIG. 1 shows a state where the aqueous medium 1 has been removed from the state shown in the diagram (3) of FIG. 1.

The diagram (5) of FIG. 1 is a schematic cross-sectional view showing an embodiment of the hollow particle after the solvent removal step. The diagram (5) of FIG. 1 shows a state where the hydrocarbon solvent 4a has been removed from the state shown in the diagram (4) of FIG. 1. By the removal of the hydrocarbon solvent from the hollow particle (the second precursor particle) including the hydrocarbon solvent in the hollow portion, a hollow particle 100 having a gas-filled hollow portion 8 in the interior of the shell 6, is obtained.

Hereinbelow, the five steps described above and other steps are described in order.

(1) Mixture Liquid Preparation Step

The mixture liquid preparation step includes preparing the mixture liquid containing the first polymerizable monomer, the hydrocarbon solvent, the dispersion stabilizer and the aqueous medium.

The mixture liquid preferably further contains a particle diameter control agent. Also, the mixture liquid preferably contains an oil-soluble polymerization initiator as a polymerization initiator. Also, the mixture liquid may further contain other materials such as a suspension stabilizer, to the extent that does not impair the effects of the present disclosure.

The materials for the mixture liquid will be described in the order of (A) the first polymerizable monomer, (B) the particle diameter control agent, (C) the oil-soluble polymerization initiator, (D) the hydrocarbon solvent, (E) the dispersion stabilizer and (F) the aqueous medium.

(A) First Polymerizable Monomer

The first polymerizable monomer contains at least the crosslinkable monomer. It may further contain the non-crosslinkable monomer to the extent that does not impair the effects of the present disclosure.

From the point of view that the polymerization reaction is easily stabilized and hollow particles with high heat resistance are obtained, a (meth)acrylic polymerizable monomer containing a (meth)acryloyl group as a polymerizable functional group, is preferably used as the first polymerizable monomer.

[Crosslinkable Monomer]

Since the crosslinkable monomer has a plurality of polymerizable functional groups, monomers can be linked together, and the crosslinking density of the shell can be increased.

As the crosslinkable monomer, examples include, but are not limited to, a bifunctional crosslinkable monomer having two polymerizable functional groups, such as divinylbenzene, divinylbiphenyl, divinylnaphthalene, diallyl phthalate, allyl (meth)acrylate, vinyl (meth)acrylate, ethylene glycol di(meth)acrylate, diethylene glycol di(meth)acrylate, pentaerythritol di(meth)acrylate, and 2-hydroxy-3-(meth)acryloyloxypropyl (meth)acrylate, and a trifunctional or higher-functional crosslinkable monomer having three or more polymerizable functional groups, such as trimethylolpropane tri(meth)acrylate, ditrimethylolpropane tetra(meth)acrylate, pentaerythritol tri(meth)acrylate, pentaerythritol tetra(meth)acrylate, dipentaerythritol hexa(meth)acrylate, dipentaerythritol poly(meth)acrylate, and ethoxylates thereof. These crosslinkable monomers may be used alone or in combination of two or more.

Of these crosslinkable monomers, examples of the hydrophilic crosslinkable monomer having a solubility of 0.3 g/L or more in distilled water at 20° C., include ethylene glycol dimethacrylate, diethylene glycol diacrylate, aryl methacrylate, vinyl methacrylate, and 2-hydroxy-3-methacryloyloxypropyl acrylate.

The crosslinkable monomer contained in the first polymerizable monomer is not particularly limited. It may be a hydrophilic crosslinkable monomer having a solubility of 0.3 g/L or more in distilled water at 20° C., or it may be a non-hydrophilic crosslinkable monomer having a solubility of less than 0.3 g/L in distilled water at 20° C.

As the crosslinkable monomer, the first polymerizable monomer preferably contains at least the bifunctional crosslinkable monomer, and the first polymerizable monomer more preferably contains a combination of the bifunctional crosslinkable monomer and the trifunctional or higher-functional crosslinkable monomer. A case in which the first polymerizable monomer contains the trifunctional or higher-functional crosslinkable monomer, is superior in that the covalent bond network can be more tightly strung in the shell; however, unreacted polymerizable functional groups tend to remain after the first polymerization reaction. In the production method of the present disclosure, even when the first polymerizable monomer contains the trifunctional or higher-functional crosslinkable monomer, the polymerization reaction of the unreacted polymerizable functional groups remaining after the first polymerization reaction, is likely to progress by the second polymerization reaction performed by adding the hydrophilic monomer as the second polymerizable monomer. Accordingly, when the first polymerizable monomer contains the trifunctional or higher-functional crosslinkable monomer, the crosslinked structure of the shell is more densified; the strength of the hollow particles is increased; and the hollow particles are made less likely to collapse.

From the point of view that the polymerization reaction is easily stabilized and hollow particles with high strength and high heat resistance are obtained, as the bifunctional crosslinkable monomer, divinylbenzene, ethylene glycol di(meth)acrylate and pentaerythritol di(meth)acrylate are preferred, and ethylene glycol di(meth)acrylate and pentaerythritol di(meth)acrylate are more preferred.

From the same point of view, as the trifunctional or higher-functional crosslinkable monomer, pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate and dipentaerythritol poly(meth)acrylate are preferred, and pentaerythritol tetra(meth)acrylate is more preferred.

In 100 parts by mass of the first polymerizable monomer, the content of the crosslinkable monomer is from 75 parts by mass to 100 parts by mass. When the content of the crosslinkable monomer is 75 parts by mass or more, since the content of the crosslinkable monomer unit in the shell of the hollow particles is large enough, the covalent bond network is more tightly strung in the shell. As a result, the hollow particles are excellent in strength, are less likely to collapse, and are less likely to deform even when heat or the like is applied from the outside.

In 100 parts by mass of the first polymerizable monomer, the content of the crosslinkable monomer is preferably from 80 parts by mass to 100 parts by mass, more preferably from 85 parts by mass to 100 parts by mass, and still more preferably from 90 parts by mass to 100 parts by mass.

The content of the bifunctional crosslinkable monomer in 100 parts by mass of the first polymerizable monomer is not particularly limited. The lower limit is preferably 50 parts by mass or more, more preferably 60 parts by mass or more, still more preferably 70 parts by mass or more, and even more preferably 75 parts by mass or more. The upper limit is preferably 100 parts by mass or less, more preferably 95 parts by mass or less, and still more preferably 90 parts by mass or less.

When the first polymerizable monomer contains the trifunctional or higher-functional crosslinkable monomer as the crosslinkable monomer, the content of the trifunctional or higher-functional crosslinkable monomer in 100 parts by mass of the first polymerizable monomer is not particularly limited. The lower limit is preferably 5 parts by mass or more, more preferably 10 parts by mass or more, and still more preferably 15 parts by mass or more. The upper limit is preferably 50 parts by mass or less, more preferably 40 parts by mass or less, still more preferably 30 parts by mass or less, and even more preferably 25 parts by mass or less.

[Non-Crosslinkable Monomer]

The first polymerizable monomer may further contain a non-crosslinkable monomer.

As the non-crosslinkable monomer, a monovinyl monomer is preferably used. The monovinyl monomer is a compound having one polymerizable vinyl functional group. As the monovinyl monomer, examples include, but are not limited to, the following non-hydrophilic non-crosslinkable monomers and hydrophilic non-crosslinkable monomers: non-hydrophilic non-crosslinkable monomers including a (meth)acrylic acid alkyl ester containing an alkyl group having 6 or more carbon atoms, such as 2-ethylhexyl (meth) acrylate and lauryl (meth)acrylate; an aromatic vinyl monomer such as styrene, vinyltoluene, α-methylstyrene, p-methylstyrene and halogenated styrene; a monoolefin monomer such as ethylene, propylene and butylene; a diene monomer such as butadiene and isoprene; a carboxylic acid vinyl ester monomer such as vinyl acetate; a vinyl halide monomer such as vinyl chloride; a vinylidene halide monomer such as vinylidene chloride; and vinylpyridine, and hydrophilic non-crosslinkable monomers including a (meth)acrylic acid alkyl ester containing an alkyl group having 1 to 5 carbon atoms, such as methyl (meth)acrylate, ethyl (meth)acrylate and butyl (meth)acrylate; a (meth)acrylamide such as (meth) acrylamide, N-methylol (meth)acrylamide and N-butoxymethyl (meth)acrylamide and derivatives thereof; (meth) acrylic acid nitrile; and a polar group-containing non-crosslinkable monomer.

For example, the polar group-containing non-crosslinkable monomer is preferably a non-crosslinkable monomer containing a polar group selected from a carboxyl group, a hydroxyl group, a sulfonic acid group, an amino group, a polyoxyethylene group and an epoxy group. As such a non-crosslinkable monomer, examples include, but are not limited to, a carboxyl group-containing monomer such as an ethylenically unsaturated carboxylic acid monomer such as (meth)acrylic acid, crotonic acid, cinnamic acid, itaconic acid, fumaric acid, maleic acid and butene tricarboxylic acid; a hydroxyl group-containing monomer such as 2-hydroxyethyl (meth)acrylate, 2-hydroxypropyl (meth)acrylate and 4-hydroxybutyl (meth)acrylate; a sulfonic acid group-containing monomer such as styrenesulfonic acid; an amino group-containing monomer such as dimethylaminoethyl (meth)acrylate and diethylaminoethyl (meth)acrylate; a polyoxyethylene group-containing monomer such as methoxypolyethylene glycol (meth)acrylate; and an epoxy group-containing monomer such as glycidyl (meth)acrylate, allyl glycidyl ether and 4-hydroxybutyl acrylate glycidyl ether.

These non-crosslinkable monomers may be used alone or in combination of two or more.

From the viewpoint of obtaining the hollow particles with excellent strength, as the non-crosslinkable monomer used as the first polymerizable monomer, hydrophilic non-crosslinkable monomers are more preferred, (meth)acrylic acid alkyl esters containing an alkyl group having 1 to 5 carbon atoms are more preferred, (meth)acrylic acid alkyl esters containing an alkyl group having 1 to 4 carbon atoms are still more preferred, and methyl (meth)acrylate is even more preferred.

In the first polymerizable monomer, the polymerizable monomer other than the crosslinkable monomer is the non-crosslinkable monomer. In 100 parts by mass of the first polymerizable monomer, the content of the non-crosslinkable monomer is from 0 parts by mass to 25 parts by mass. The content of the non-crosslinkable monomer in the first polymerizable monomer is preferably 20 parts by mass or less, more preferably 15 parts by mass or less, and still more preferably 10 parts by mass or less, and the first polymerizable monomer is particularly preferably free of the non-crosslinkable monomer, from the following points of view: a decrease in the reactivity of the first polymerizable monomer is suppressed; the strength of the hollow particles is increased; and the hollow particles are made less likely to collapse.

The content of the first polymerizable monomer in the mixture liquid is not particularly limited. From the viewpoint of the balance of the void ratio, particle diameter and mechanical strength of the hollow particles, with respect to the total mass (100% by mass) of the components (except for the aqueous medium) in the mixture liquid, the content of the first polymerizable monomer is generally from 15% by mass to 55% by mass, and more preferably from 25% by mass to 40% by mass.

(B) Particle Diameter Control Agent

The mixture liquid preferably further contains the particle diameter control agent. When the mixture liquid contains the particle diameter control agent, the particle diameter of the droplets of the monomer composition and the thickness of the shell of the obtained hollow particles can be appropriately controlled. Accordingly, the hollow particles which are less likely to collapse even when the void ratio is high, can be obtained.

As the particle diameter control agent, for example, at least one selected from the group consisting of rosin acids, higher fatty acids and metal salts thereof, or a polar resin described later, can be used. In the suspension step described later, the particle diameter control agent can appropriately control the particle diameter of the droplets of the monomer composition containing the first polymerizable monomer and the hydrocarbon solvent. In the suspension step, the droplets of the monomer composition are formed in the aqueous medium by the action of the dispersion stabilizer. In the droplets of the monomer composition, phase separation occurs between the hydrocarbon solvent and the material containing the first polymerizable monomer and not containing the hydrocarbon solvent; the hydrocarbon solvent is distributed in the center; and the material not containing the hydrocarbon solvent is distributed on the surface side. When the mixture liquid contains the particle diameter control agent, the droplets are presumed to have the following structure: the particle diameter control agent is distributed in the vicinity of the surface of the droplets of the monomer composition, and the dispersion stabilizer is on the surface of the droplets. Such a material distribution structure is formed according to differences in affinity for the aqueous medium between the materials. When the mixture liquid contains the particle diameter control agent, the particle diameter of the droplets of the monomer composition can be appropriately controlled. This is thought to be because the droplets of the monomer composition in the suspension have the above-mentioned material distribution structure, an interaction between the dispersion stabilizer and the particle diameter control agent occurs on the surface of the droplets, and the dispersibility of the droplets by the dispersion stabilizer is changed.

The particle diameter control agent is preferably at least one selected from the group consisting of rosin acids, higher fatty acids and metal salts thereof, and more preferably at least one selected from rosin acids and alkali metal salts thereof, since the particle diameter of the droplets can be appropriately controlled with a small content of the particle diameter control agent.

The rosin acids preferably used as the particle diameter control agent can be obtained from rosin such as gum rosin, tall rosin and wood rosin.

The components contained in the rosin acids obtained from the rosin are, for example, abietic acid, dehydroabietic acid, palustric acid, isopimaric acid and pimaric acid. The component ratio of the rosin acid is diverse, and it varies depending on the type of the rosin, the type and growing area of pine which is a raw material of rosin, etc.

The rosin acids and metal salts thereof used in the present disclosure are preferably rosin acids containing 50% by mass or more of an abietic acid compound such as abietic acid, dehydroabietic acid, palustric acid and hydrides thereof, and alkali metal salts of the rosin acids.

The higher fatty acids used as the particle diameter control agent are preferably higher fatty acids containing 10 to 25 carbon atoms in which the carbon atom of the carboxyl group is excluded. As such higher fatty acids, for example, lauric acid ($CH_3(CH_2)_{10}COOH$), tridecanoic acid ($CH_3(CH_2)_{11}COOH$), myristic acid ($CH_3(CH_2)_{12}COOH$), pentadecanoic acid ($CH_3(CH_2)_{13}COOH$), palmitic acid ($CH_3(CH_2)_{14}COOH$), heptadecanoic acid ($CH_3(CH_2)_{15}COOH$), stearic acid ($CH_3(CH_2)_{16}COOH$), arachidic acid ($CH_3(CH_2)_{15}COOH$), behenic acid ($CH_3(CH_2)_{20}COOH$) and lignoceric acid ($CH_3(CH_2)_{22}COOH$) are preferred.

As the metal used in the metal salts of the rosin acids or higher fatty acids, examples include, but are not limited to, an alkali metal such as Li, Na and K, and an alkaline-earth metal such as Mg and Ca. Of them, an alkali metal is preferred, and at least one selected from Li, Na and K is more preferred.

When at least one selected from the group consisting of rosin acids, higher fatty acids and metal salts thereof is used as the particle diameter control agent, the total content of the rosin acids, higher fatty acids and metal salts thereof is preferably 0.0001 parts by mass or more and 0.1 parts by mass or less, more preferably 0.001 parts by mass or more and 0.01 parts by mass or less, and still more preferably 0.0015 parts by mass or more and 0.006 parts by mass or less, with respect to the total (100 parts by mass) of the first polymerizable monomer and the hydrocarbon solvent. When the total content is equal to or more than the lower limit value, the particle diameter of the hollow particles and the thickness of the shell can be easily controlled, and the strength of the hollow particles can be increased. On the other hand, when the total content is equal to or less than the upper limit value, a decrease in the content of the polymerizable monomer can be suppressed. Accordingly, a decrease in the strength of the shell can be suppressed, and a collapse of the hollow particles can be further suppressed.

The polar resin that is preferably used as the particle diameter control agent, is a polymer containing a repeating unit which contains a heteroatom. As the polar resin, examples include, but are not limited to, an acrylic resin, a polyester resin, and a vinyl resin containing a heteroatom.

The polar resin may be a homopolymer or copolymer of a heteroatom-containing monomer, or it may be a copolymer of a heteroatom-containing monomer and a heteroatom-free monomer. When the polar resin is a copolymer of a heteroatom-containing monomer and a heteroatom-free monomer, from the viewpoint of easily controlling the particle diameter of the hollow particles, in 100% by mass of all the repeating units constituting the copolymer, the amount of the heteroatom-containing monomer unit is preferably 50% by mass or more, more preferably 70% by mass or more, and still more preferably 90% by mass or more.

As the heteroatom-containing monomer for the polar resin, examples include, but are not limited to, a (meth) acrylic monovinyl monomer which is a monomer containing a (meth)acryloyl group, such as methyl (meth)acrylate, ethyl (meth)acrylate, butyl (meth)acrylate, 2-ethylhexyl (meth) acrylate, lauryl (meth)acrylate, acrylic acid, methacrylic acid, 2-hydroxyethyl (meth)acrylate, 2-hydroxypropyl (meth)acrylate, 4-hydroxybutyl (meth)acrylate, methoxypolyethylene glycol (meth)acrylate, dimethylaminoethyl (meth)acrylate, diethylaminoethyl (meth)acrylate, glycidyl (meth)acrylate, and 4-hydroxybutyl acrylate glycidyl ether; an aromatic vinyl monomer containing a heteroatom, such as halogenated styrene and styrene sulfonate; a carboxylic acid vinyl ester monomer such as vinyl acetate; a vinyl halide monomer such as vinyl chloride; a vinylidene halide monomer such as vinylidene chloride; vinylpyridine; a carboxyl group-containing monomer such as an ethylenically unsaturated carboxylic acid monomer such as crotonic acid, cinnamic acid, itaconic acid, fumaric acid, maleic acid and butene tricarboxylic acid; and an epoxy group-containing monomer such as allyl glycidyl ether. These heteroatom-containing monomers may be used alone or in combination of two or more.

As the heteroatom-free monomer for the polar resin, examples include, but are not limited to, an aromatic vinyl monomer not containing a heteroatom, such as styrene, vinyltoluene, α-methylstyrene and p-methylstyrene; a monoolefin monomer such as ethylene, propylene and butylene; and a diene monomer such as butadiene and isoprene. These heteroatom-free monomers may be used alone or in combination of two or more.

From the viewpoint of high compatibility with the first polymerizable monomer and easily controlling the particle diameter of the hollow particles, the polar resin is preferably an acrylic resin. In the acrylic resin, with respect to 100% by mass of all the repeating units constituting the resin, the total mass of the (meth)acrylic monovinyl monomer unit is preferably 50% by mass or more, more preferably 70% by mass or more, and still more preferably 90% by mass or more. The polar resin is particularly preferably an acrylic resin such that all the repeating units constituting the resin are composed of the (meth)acrylic monovinyl monomer unit.

In the polar resin, from the viewpoint of easily controlling the particle diameter of the hollow particles, it is preferable that the heteroatom-containing monomer unit contains a polar group-containing monomer unit that contains a polar group selected from a carboxyl group, a hydroxyl group, a sulfonic acid group, an amino group, a polyoxyethylene group and an epoxy group. As the polar group-containing monomer used in the polar resin, examples include, but are not limited to, polar group-containing non-crosslinkable monomers that are the same as those that may be contained in the above-described first polymerizable monomer. The polar group-containing monomers may be used alone or in combination of two or more. As the polar group contained in the polar group-containing monomer unit contained in the polar resin, a carboxyl group and a hydroxyl group are preferred, from the point of view that the particle diameter can be controlled by adding a small amount thereof.

When the polar resin contains the polar group-containing monomer unit, it is preferable that the polar group is present at the end of the main chain or that of a side chain, or the polar group is bound to the main chain or a side chain in a pendant form, from the point of view that the polar resin can be easily disposed on the outer surface of the hollow particles and that the particle diameter of the hollow particles can be easily controlled.

When the polar resin does not contain the polar group-containing monomer unit, from the viewpoint of high compatibility with the first polymerizable monomer and easily controlling the particle diameter of the hollow particles, the polar resin preferably contains a monomer unit derived from a (meth)acrylic acid alkyl ester as the heteroatom-containing monomer unit. Especially from the viewpoint of high polarity, the polar resin preferably contains a monomer unit derived from a (meth)acrylic acid alkyl ester in which the alkyl group has 3 or less carbon atoms, more preferably a monomer unit derived from a (meth)acrylic acid alkyl ester in which the alkyl group is a methyl group or an ethyl group, and still more preferably a monomer unit derived from a (meth)acrylic acid alkyl ester in which the alkyl group is a methyl group.

From the viewpoint of high compatibility with the first polymerizable monomer and easily controlling the particle diameter of the hollow particles, the acrylic resin as the polar resin is preferably a polymer or copolymer of polymerizable monomers for polar resin, which include 505 by mass or more of methyl methacrylate with respect to the total mass (100% by mass) of the polymerizable monomers for polar resin. In the present disclosure, the polymerizable monomer used for synthesis of the polar resin is referred to as the "polymerizable monomer for polar resin".

The polar resin can be obtained by, for example, polymerizing polymerizable monomers for polar resin, which include the heteroatom-containing monomer, by a polymerization method such as solution polymerization and emulsion polymerization.

When the polar resin is a copolymer, the copolymer may be any one of a random copolymer, a block copolymer and a graft copolymer. The polar resin is preferably a random copolymer.

From the viewpoint of increasing the solubility, the polar resin is preferably finely pulverized.

The number average molecular weight (Mn) of the polar resin is not particularly limited. The polystyrene equivalent number average molecular weight (Mn) of the polar resin measured by gel permeation chromatography (GPC) using tetrahydrofuran is preferably in a range of 3000 or more and 20000 or less, more preferably in a range of 4000 or more and 17000 or less, and still more preferably in a range of 6000 or more and 15000 or less. When the number average molecular weight (Mn) of the polar resin is equal to or more than the lower limit value, the solubility of the polar resin is increased, and the particle diameter of the hollow particles can be easily controlled. When the number average molecular weight of the polar resin is equal to or less than the upper limit value, a decrease in the strength of the shell can be suppressed.

When the polar resin is used as the particle diameter control agent, the content of the polar resin is preferably 0.1 parts by mass or more and 10.0 parts by mass or less, more preferably 0.3 parts by mass or more and 8.0 parts by mass or less, and still more preferably 0.5 parts by mass or more and 8.0 parts by mass or less, with respect to 100 parts by mass of the first polymerizable monomer. When the content of the polar resin is equal to or more than the lower limit value, the particle diameter of the hollow particles and the thickness of the shell can be easily controlled, and the strength of the hollow particles can be increased. On the other hand, when the content of the polar resin is equal to or less than the upper limit value, a decrease in the content of the polymerizable monomer can be suppressed. Accordingly, a decrease in the strength of the shell can be suppressed, and a collapse of the hollow particles can be further suppressed.

(C) Oil-Soluble Polymerization Initiator

In the present disclosure, the mixture liquid preferably contains an oil-soluble polymerization initiator as the polymerization initiator. As the method for polymerizing the droplets of the monomer composition after suspending the mixture liquid, examples include an emulsion polymerization method using a water-soluble polymerization initiator and a suspension polymerization method using an oil-soluble polymerization initiator. By using the oil-soluble polymerization initiator, suspension polymerization can be performed.

The oil-soluble polymerization initiator is not particularly limited, as long as it is a lipophilic one having a solubility in water of 0.2% by mass or less. As the oil-soluble polymerization initiator, examples include, but are not limited to, benzoyl peroxide, lauroyl peroxide, t-butyl peroxide 2-ethylhexanoate, 2,2'-azobis(2,4-dimethylvaleronitrile) and azobis(isobutyronitrile).

When the total mass of the first polymerizable monomer in the mixture liquid is regarded as 100 parts by mass, the content of the oil-soluble polymerization initiator is preferably from 0.1 parts by mass to 10 parts by mass, more preferably from 0.5 parts by mass to 7 parts by mass, and still more preferably from 1 part by mass to 5 parts by mass. When the content of the oil-soluble polymerization initiator is from 0.1 parts by mass to 10 parts by mass, a polymerization reaction can progress sufficiently; the oil-soluble polymerization initiator is less likely to remain after the end of the polymerization reaction; and an unexpected side reaction is less likely to progress.

(D) Hydrocarbon Solvent

In the present disclosure, the hydrocarbon solvent is used as a non-polymerizable, sparingly water-soluble organic solvent. The hydrocarbon solvent serves as a spacer material for forming the hollow portion in the interior of the particles. In the suspension step described later, the suspension in which the droplets of the monomer composition containing the hydrocarbon solvent are dispersed in the aqueous medium, is obtained. In the suspension step, phase separation occurs in the droplets of the monomer composition. As a result, the hydrocarbon solvent with low polarity is likely to collect in the interior of the droplets of the polymerizable monomer. In the end, according to their respective polarities, the hydrocarbon solvent is distributed in the interior of the droplets of the monomer composition, and the material not containing the hydrocarbon solvent is distributed at the periphery of the droplets of the monomer composition.

Then, in the polymerization step described later, an aqueous dispersion containing the hollow particles including the hydrocarbon solvent, is obtained. That is, since the hydrocarbon solvent collects in the interior of the particles, the hollow portion filled with the hydrocarbon solvent is formed in the interior of the obtained precursor particles.

The type of the hydrocarbon solvent is not particularly limited. Examples of the hydrocarbon solvent include a saturated hydrocarbon solvent such as butane, pentane, n-hexane, cyclohexane, heptane and octane, an aromatic hydrocarbon solvent such as benzene, toluene and xylene, and a solvent with relatively high volatility such as carbon disulfide and carbon tetrachloride.

The void ratio of the hollow particles can be controlled by changing the amount of the hydrocarbon solvent in the mixture liquid. In the suspension step described later, the polymerization reaction progresses while oil droplets containing the crosslinkable monomer and so on include the hydrocarbon solvent. Accordingly, as the content of the hydrocarbon solvent increases, the void ratio of the obtained hollow particles tends to increase.

In the hydrocarbon solvent, the amount of the saturated hydrocarbon solvent is preferably 50% by mass or more, with respect to the total amount (100, by mass) of the hydrocarbon solvent. Accordingly, sufficient phase separation occurs in the droplets of the monomer composition. As a result, hollow particles having only one hollow portion can be easily obtained, and the production of porous particles can be suppressed. The amount of the saturated hydrocarbon solvent is preferably 60% by mass or more, and more preferably 80 by mass or more, from the point of view that the production of porous particles is further suppressed, and that the hollow portions of the hollow particles are likely to be uniform.

The hydrocarbon solvent is preferably a hydrocarbon solvent having 4 to 7 carbon atoms. A hydrocarbon compound having 4 to 7 carbon atoms can be easily included in the first precursor particles in the polymerization step and can be easily removed from the second precursor particles in the solvent removal step. A hydrocarbon solvent having 5 or 6 carbon atoms is particularly preferred.

From the viewpoint of ease of removal in the solvent removal step described later, the hydrocarbon solvent is preferably a hydrocarbon solvent having a boiling point of 130° C. or less, and more preferably a hydrocarbon solvent having a boiling point of 100° C. or less. The hydrocarbon solvent is preferably a hydrocarbon solvent having a boiling point of 50° C. or more, and more preferably a hydrocarbon solvent having a boiling point of 60° C. or more, from the point of view that the hydrocarbon solvent can be easily included in the first precursor particles.

The relative permittivity at 20° C. of the hydrocarbon solvent is preferably 3 or less. The relative permittivity is one of the indices of the level of the polarity of a compound. In the case where the relative permittivity of the hydrocarbon solvent is 3 or less and sufficiently small, it is considered that phase separation progresses rapidly in the droplets of the monomer composition and a hollow is easily formed.

Examples of solvents having a relative permittivity at 20° C. of 3 or less, are as follows. The inside of the parentheses is the value of relative permittivity.

Heptane (1.9), cyclohexane (2.0), benzene (2.3), and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

In the present disclosure, with respect to the total mass (100 parts by mass) of the first polymerizable monomer, the content of the hydrocarbon solvent in the mixture liquid is preferably 50 parts by mass or more and 500 parts by mass or less, from the following viewpoints: the particle diameter of the hollow particles is easily controlled; the void ratio is easily increased while maintaining the strength of the hollow particles; and the amount of the residual hydrocarbon solvent in the particles is easily reduced. With respect to the total mass (100 parts by mass) of the first polymerizable monomer, the content of the hydrocarbon solvent in the mixture liquid is preferably 60 parts by mass or more and 400 parts by mass or less, more preferably 70 parts by mass or more and 300 parts by mass or less, and still more preferably 80 parts by mass or more and 200 parts by mass or less.

(E) Dispersion Stabilizer

The dispersion stabilizer is an agent for dispersing the droplets of the monomer composition in the aqueous medium in the suspension step. In the present disclosure, an inorganic dispersion stabilizer is preferably used as the dispersion stabilizer, from the point of view that the particle diameter of the droplets can be easily controlled in the suspension and the particle size distribution of the obtained hollow particles can be sharp, and that an excessive decrease in the shell thickness is suppressed, and a decrease in the strength of the hollow particles is suppressed. The inorganic dispersion stabilizer can exert such effects especially when the inorganic dispersion stabilizer is used in combination with the above-described particle diameter control agent.

As the inorganic dispersion stabilizer, examples include, but are not limited to, inorganic compounds including a sulfate such as barium sulfate and calcium sulfate; a carbonate such as barium carbonate, calcium carbonate and magnesium carbonate; a phosphate such as calcium phosphate; a metal oxide such as aluminum oxide and titanium oxide; and a metal hydroxide such as aluminum hydroxide, magnesium hydroxide, calcium hydroxide, barium hydroxide and iron(II)hydroxide. These inorganic dispersion stabilizers may be used alone or in combination of two or more.

Of these inorganic dispersion stabilizers, a sparingly water-soluble inorganic metal salt such as the above-mentioned sulfate, carbonate, phosphate and metal hydroxide is preferred; a metal hydroxide is more preferred; and a magnesium hydroxide is particularly preferred.

In the present disclosure, the sparingly water-soluble inorganic metal salt is preferably an inorganic metal salt such that the solubility in 100 g of water is 0.5 g or less.

The content of the dispersion stabilizer is not particularly limited. With respect to the total mass (100 parts by mass) of the first polymerizable monomer and the hydrocarbon solvent, the content of the dispersion stabilizer is preferably from 0.5 parts by mass to 10 parts by mass, and more preferably from 1.0 part by mass to 8.0 parts by mass. When the content of the dispersion stabilizer is equal to or more than the lower limit value, the droplets of the monomer composition can be sufficiently dispersed in the suspension so that they do not join together. On the other hand, when the content of the dispersion stabilizer is equal to or less than the upper limit value, an increase in the viscosity of the suspension is prevented in the formation of the droplets, and a problem such that the suspension cannot pass through a droplet forming machine, can be avoided.

With respect to 100 parts by mass of the aqueous medium, the content of the dispersion stabilizer is generally 2 parts by mass or more and 15 parts by mass or less, and preferably 3 parts by mass or more and 8 parts by mass or less.

(F) Aqueous Medium

In the present disclosure, the term "aqueous medium" means a medium selected from the group consisting of water, a hydrophilic solvent and a mixture thereof.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, from the viewpoint of forming the droplets of the monomer composition, it is important that the polarity of the entire mixture is not too low. In this case, for example, the mixing ratio (mass ratio) between water and the hydrophilic solvent may be set to water:hydrophilic solvent=99:1 to 50:50.

The mixture liquid is obtained by mixing the above-mentioned materials and other materials as needed, appropriately stirring the mixture, etc. In the mixture liquid, an oil phase containing the lipophilic materials such as (A) the first polymerizable monomer, (B) the particle diameter control agent, (C) the oil-soluble polymerization initiator and (D) the hydrocarbon solvent, is dispersed with a size of a particle diameter of approximately several millimeters in an aqueous phase containing (E) the dispersion stabilizer, (F) the aqueous medium, etc. The dispersion state of these materials in the mixture liquid can be observed with the naked eye, depending on the types of the materials.

In the mixture liquid preparation step, the mixture liquid may be obtained by simply mixing the above-mentioned materials and other materials as needed, appropriately stirring the mixture, etc. From the point of view that the shell can be easily uniform, it is preferable to prepare the mixture liquid by separately preparing the oil phase containing the first polymerizable monomer, the particle diameter control agent and the hydrocarbon solvent with the aqueous phase containing the dispersion stabilizer and the aqueous medium in advance, and then mixing the phases together.

As just described, by separately preparing the oil phase and the aqueous phase in advance and then mixing them, hollow particles such that the composition of the shell portion is uniform, can be produced.

(2) Suspension Step

The suspension step includes suspending the mixture liquid to prepare a suspension in which the droplets of the monomer composition containing the hydrocarbon solvent are dispersed in the aqueous medium.

The suspension method for forming the droplets of the monomer composition is not particularly limited. For example, it is performed using an apparatus capable of performing strong stirring, such as an (in-line type) emulsifying disperser (manufactured by Pacific Machinery & Engineering Co., Ltd.; product name: MILDER) and a high-speed emulsifying disperser (manufactured by PRIMIX Corporation; product name: T.K. HOMOMIXER MARK II Type).

In the suspension prepared in the suspension step, the droplets of the monomer composition containing the lipophilic materials mentioned above and having a particle diameter of approximately from 4 μm to 60 μm, are dispersed uniformly in the aqueous medium. Such droplets of the monomer composition are difficult to observe with the naked eye and can be observed with known observation equipment such as an optical microscope.

In the suspension step, since phase separation occurs in the droplets of the monomer composition, the hydrocarbon solvent with low polarity is likely to collect in the interior of the droplets. As a result, in the obtained droplets, the hydrocarbon solvent is distributed in the interior thereof, and the material not containing the hydrocarbon solvent is distributed at the periphery thereof.

Figure 2:
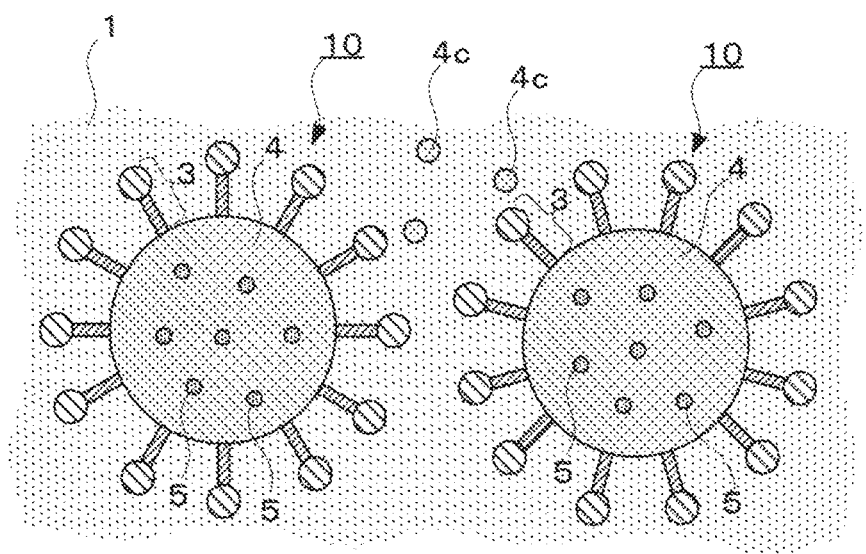
FIG. 2 is a schematic diagram showing an embodiment of a suspension in a suspension step.

FIG. 2 is a schematic diagram showing an embodiment of the suspension in the suspension step. Each droplet 10 of the monomer composition in FIG. 2 schematically shows a cross section thereof. FIG. 2 is merely a schematic diagram, and the suspension in the present disclosure is not limited to that shown in FIG. 2. A part of FIG. 2 corresponds to the diagram (2) of FIG. 1 described above.

FIG. 2 shows a state where the droplets 10 of the monomer composition and the first polymerizable monomer 4c dispersed in the aqueous medium 1, are dispersed in the aqueous medium 1. Each droplet 10 is formed by the oil-soluble monomer composition 4 and a dispersion stabilizer 3 surrounding the periphery of the oil-soluble monomer composition 4.

The monomer composition contains the oil-soluble polymerization initiator 5, the first polymerizable monomer and the hydrocarbon solvent (none of them is illustrated).

Each droplet 10 is a minute oil droplet which contains the monomer composition 4, and the oil-soluble polymerization initiator 5 generates polymerization initiating radicals in the interior of the minute oil droplet. Therefore, the precursor particles with a target particle diameter can be produced without excessively growing the minute oil droplet.

In such a suspension polymerization method using the oil-soluble polymerization initiator, there is no opportunity for the polymerization initiator to come into contact with the polymerizable monomer 4c dispersed in the aqueous medium 1. Thus, the generation of surplus polymer particles (e.g., solid particles having a relatively small particle diameter) in addition to the target resin particles having the hollow portion, can be suppressed by using the oil-soluble polymerization initiator.

(3) Polymerization Step (3-1) First Polymerization Step

In the production method of the present disclosure, the polymerization step is carried out in two stages.

In the first polymerization step, the first polymerization reaction is performed by subjecting the suspension to a polymerization reaction, until the polymerization conversion rate of the first polymerizable monomer reaches 93% by mass or more. Accordingly, the first precursor composition containing the first precursor particles that have the shell containing the polymer of the first polymerizable monomer and the hollow portion filled with the hydrocarbon solvent, is prepared.

In the first polymerization reaction, the droplets of the monomer composition are subjected to a polymerization reaction while the hydrocarbon solvent is included in them. Accordingly, the polymerization reaction is likely to progress while the shape of the droplets is retained. As a result, the size and void ratio of the obtained hollow particles can be easily controlled by controlling the amount of the hydrocarbon solvent, the amount of the particle diameter control agent, the type of the dispersion stabilizer, and so on in the first polymerization reaction. Moreover, since the above-described first polymerizable monomer and the hydrocarbon solvent are used together, the polarity of the hydrocarbon solvent is low with respect to the shell of the first precursor particles, and the hydrocarbon solvent is not easily compatible with the shell. Accordingly, sufficient phase separation occurs and only one hollow portion is likely to be formed.

In the first polymerization reaction, the polymerization system is not particularly limited. For example, a batch system, a semicontinuous system or a continuous system may be employed.

In the first polymerization reaction, the polymerization temperature is preferably from 40° C. to 80° C., and more preferably from 50° C. to 70° C.

Also in the first polymerization reaction, the temperature increase rate up to the polymerization temperature, is preferably from 10° C./h to 60° C./h, and more preferably from 15° C./h to 55° C./h.

The polymerization reaction time of the first polymerization reaction is preferably from 0.5 hours to 5 hours, and more preferably from 1 hour to 3 hours.

In the production method of the present disclosure, the first polymerization reaction is continued until the polymerization conversion rate of the first polymerizable monomer reaches 93% by mass or more, preferably 95% by mass or more, more preferably 98% by mass or more, and still more preferably 99% by mass or more.

In the present disclosure, the polymerization conversion rate is obtained by the following formula (A) using the mass of the solid component of the first precursor particles obtained by the first polymerization reaction and the mass of the first polymerizable monomer remaining unreacted after the first polymerization reaction. In the present disclosure, the solid component includes all components excluding a solvent, and a liquid polymerizable monomer and the like are included in the solid component. The mass of the unreacted first polymerizable monomer can be measured by gas chromatography (GC).

Polymerization conversion rate (% by mass)=100−
(Mass of the unreacted first polymerizable
monomer/Mass of the solid component of the
first precursor particles)×100   Formula (A)

(3-2) Second Polymerization Step

In the second polymerization step, the second polymerization reaction is performed by adding the second polymerizable monomer having a solubility of 0.3 g/L or more in distilled water at 20° C. to the first precursor composition obtained by the first polymerization step and subjecting the composition to the polymerization reaction. Accordingly, the second precursor composition containing the second precursor particles that have the shell containing the polymer of the first and second polymerizable monomers and the hollow portion filled with the hydrocarbon solvent, is prepared.

In the second polymerization reaction, the polymerization reaction progresses in the state where the second polymerizable monomer is incorporated in the shell of the first precursor particles. The thermal motion of the shell of the first precursor particles is accelerated by incorporating the second polymerizable monomer in the shell. Accordingly, in the second polymerization reaction, the polymerization reaction of the second polymerizable monomer and the polymerizable functional groups of the first polymerizable monomer remaining unreacted in the shell, is presumed to sufficiently progress and result in the formation of the dense crosslinked structure.

The second polymerizable monomer is not particularly limited, as long as it is a polymerizable monomer having a solubility of 0.3 g/L or more in distilled water at 20° C. From the viewpoint of increasing the strength of the hollow particles, the second polymerizable monomer is preferably a non-crosslinkable monomer having a solubility of 0.3 g/L or more in distilled water at 20° C., that is, a hydrophilic non-crosslinkable monomer. As the hydrophilic non-crosslinkable monomer used as the second polymerizable monomer, examples include, but are not limited to, those that are used as the first polymerizable monomer, such as a (meth)acrylic acid alkyl ester containing an alkyl group having 1 to 5 carbon atoms, a (meth)acrylamide and derivatives thereof, (meth)acrylic acid nitrile, and a polar group-containing non-crosslinkable monomer.

The solubility of the second polymerizable monomer in distilled water at 20° C., is preferably 2 g/L or more, more preferably 10 g/L or more, still more preferably 15 g/L or more, even more preferably 20 g/L or more, and particularly preferably 50 g/L or more, due to the following reasons: it becomes easier for the second polymerizable monomer to be incorporated in the shell of the first precursor particles to accelerate the thermal motion of the shell, and the strength of the hollow particles is increased. The upper limit of the solubility of the second polymerizable monomer in distilled water at 20° C., is not particularly limited, and it is generally 80 g/L or less.

The molecular weight of the second polymerizable monomer is preferably 200 or less, and more preferably 100 or less, from the following points of view: it becomes easier for the second polymerizable monomer to be incorporated in the shell of the first precursor particles to accelerate the thermal motion of the shell, and the strength of the hollow particles is increased. The lower limit of the molecular weight of the second polymerizable monomer is not particularly limited, and it is generally 50 or more.

From the viewpoint of increasing the strength of the hollow particles, the second polymerizable monomer is preferably at least one selected from the group consisting of a (meth)acrylic acid alkyl ester containing an alkyl group having 1 to 5 carbon atoms, and (meth)acrylic acid nitrile. The second polymerizable monomer is more preferably at least one selected from the group consisting of methyl (meth)acrylate, ethyl (meth)acrylate, butyl (meth)acrylate and acrylic acid nitrile.

The amount of the added second polymerizable monomer is preferably from 3 parts by mass to 15 parts by mass, and more preferably from 4 parts by mass to 10 parts by mass, with respect to 100 parts by mass of the first polymerizable monomer. When the amount of the added second polymerizable monomer is equal to or more than the lower limit value, the effect of accelerating the polymerization reaction by the addition of the second polymerizable monomer, is increased, and the crosslinked structure of the shell of the hollow particles is more densified. Accordingly, the strength of the hollow particles is increased and makes the hollow particles less likely to collapse. On the other hand, when the amount of the added second polymerizable monomer is equal to or less than the upper limit value, a decrease in the content of the first polymerizable monomer with respect to the whole polymerizable monomers used to form the shell, is suppressed. The first polymerizable monomer contains a large amount of the crosslinkable monomer. Accordingly, due to the suppression of a decrease in the content of the first polymerizable monomer, hollow particles which contain many crosslinked structures formed by the crosslinkable monomers and which have excellent strength, are obtained.

In the second polymerization reaction performed after the addition of the second polymerizable monomer, the polymerization system is not particularly limited, and the same polymerization system as the system used in the first polymerization reaction, may be employed.

The polymerization temperature of the second polymerization reaction is preferably from 40° C. to 80° C., and more preferably from 50° C. to 70° C.

The reaction time of the second polymerization reaction is preferably from 1 hour to 6 hours, and more preferably from 2 hours to 4 hours.

By the above-described production method of the present disclosure, the amount of the unreacted polymerizable monomer remaining after the second polymerization reaction, can be controlled to preferably 750 ppm or less, more preferably 500 ppm or less, and still more preferably 300 ppm or less.

In the present disclosure, the amount of the unreacted polymerizable monomer remaining after the second polymerization reaction, means the ratio of the mass of the polymerizable monomer remaining unreacted to the mass of the solid component of the hollow particles obtained by the second polymerization reaction. The mass of the unreacted polymerizable monomer can be measured by gas chromatography (GC).

(4) Solid-Liquid Separation Step

This step includes performing solid-liquid separation of the second precursor composition, which contains the hollow particles (the second precursor particles) including the hydrocarbon solvent and which is obtained by the above-described polymerization step, to obtain a solid component containing the second precursor particles.

The method of performing the solid-liquid separation of the second precursor composition is not particularly limited, and a known method may be used. Examples of the solid-liquid separation method include a centrifugation method, a filtration method, and still-standing separation. Among them, a centrifugation method or a filtration method may be employed, and from the viewpoint of simplicity of the operation, a centrifugation method may be employed.

Any step such as a preliminary drying step may be performed at a time after the solid-liquid separation step and before performing the solvent removal step described later. Examples of the preliminary drying step include performing preliminary drying on the solid component obtained after the solid-liquid separation step, by use of a drying apparatus such as a dryer and a drying appliance such as a hand dryer.

(5) Solvent Removal Step

This step includes removing the hydrocarbon solvent from the hollow particles (the second precursor particles) obtained by the solid-liquid separation step.

By removing the hydrocarbon solvent from the second precursor particles in a gaseous atmosphere, the hydrocarbon solvent in the interior of the second precursor particles is substituted with air, and the hollow particles filled with gas are obtained.

In this step, the term "in a gaseous atmosphere" includes "in an environment where no liquid component exists in the outside of the second precursor particles" and "in an environment where only a very small amount of liquid component at a level that does not influence the removal of the hydrocarbon solvent, exists in the outside of the second precursor particles" in a strict sense. The term "in a gaseous atmosphere" can be reworded as a state where the second precursor particles do not exist in a slurry, or it can be reworded as a state where the second precursor particles exist in a dry powder. That is, in this step, it is important to remove the hydrocarbon solvent in an environment where the second precursor particles come into direct contact with the outside gas.

The method of removing the hydrocarbon solvent from the second precursor particles in a gaseous atmosphere, is not particularly limited, and a known method may be employed. Examples of the method include a reduced pressure drying method, a heat drying method, a flash drying method, and the combination of these methods.

Especially, in the case of using the heat drying method, the heating temperature needs to be set to more than or equal to the boiling point of the hydrocarbon solvent and less than or equal to the highest temperature at which the shell structure of the second precursor particles does not collapse. Accordingly, depending on the composition of the shell and the type of the hydrocarbon solvent in the second precursor particles, the heating temperature may be from 50° C. to 200° C., may be from 70° C. to 200° C., or may be from 100° C. to 200° C., for example.

The hydrocarbon solvent in the interior of the second precursor particles is substituted with the outside gas by the drying operation in the gaseous atmosphere. As a result, the hollow particles in which the hollow portion is occupied by gas, are obtained.

The drying atmosphere is not particularly limited and may be appropriately selected depending on the intended application of the hollow particles. Possible examples of the drying atmosphere include air, oxygen, nitrogen and argon. Further, by filling the interior of the hollow particles with gas once and then performing reduced pressure drying, hollow particles in which the interior is evacuated are also temporarily obtained.

As another method, the hydrocarbon solvent may be removed as follows: the second precursor composition obtained in the polymerization step, which is in the form of slurry, is not subjected to solid-liquid separation and, instead, in the slurry containing the second precursor particles and the aqueous medium, the hydrocarbon solvent included in the second precursor particles is substituted with the aqueous medium of the slurry, thereby removing the hydrocarbon solvent.

In this method, at a temperature equal to or more than the temperature obtained by subtracting 35° C. from the boiling point of the hydrocarbon solvent, an inert gas is bubbled into the second precursor composition. Accordingly, the hydrocarbon solvent can be removed from the second precursor particles.

When the hydrocarbon solvent is a mixed solvent containing several types of hydrocarbon solvents and it has several boiling points, the boiling point of the hydrocarbon solvent in the solvent removal step is determined as the boiling point of the solvent having the highest boiling point among the solvents contained in the mixed solvent, that is, the highest boiling point of the several boiling points.

The temperature at the time of bubbling the inert gas into the second precursor composition, is preferably a temperature equal to or more than the temperature obtained by subtracting 30° C. from the boiling point of the hydrocarbon solvent, and more preferably a temperature equal to or more than the temperature obtained by subtracting 20° C. from the boiling point of the hydrocarbon solvent, from the viewpoint of reducing the amount of the residual hydrocarbon solvent in the hollow particles. The temperature at the time of bubbling is generally set to a temperature equal to or more than the polymerization temperature of the polymerization step. The temperature at the time of bubbling is not particularly limited, and it may be 50° C. or more and 100° C. or less.

The inert gas used for the bubbling is not particularly limited. As the inert gas, examples include, but are not limited to, nitrogen and argon.

Depending on the type and amount of the hydrocarbon solvent, the bubbling condition is appropriately controlled so that the hydrocarbon solvent can be removed from the second precursor particles. The bubbling condition is not particularly limited. For example, the inert gas may be bubbled in an amount of 1 L/min to 3 L/min for 1 hour to 10 hours.

By this method, an aqueous slurry in which the aqueous medium is included in the second precursor particles, is obtained. The slurry is subjected to solid-liquid separation to obtain hollow particles, and the aqueous medium is removed from the hollow particles, thereby obtaining the hollow particles in which the hollow portion is occupied by gas.

The method for obtaining the hollow particles in which the hollow portion is filled with gas, by subjecting the second precursor composition in the form of slurry to solid-liquid separation and then removing the hydrocarbon solvent from the second precursor particles in the gaseous atmosphere, is compared to the method for obtaining the hollow particles in which the hollow portion is filled with gas, by substituting, in the slurry containing the second precursor particles and the aqueous medium, the hydrocarbon solvent included in the second precursor particles with the aqueous medium of the slurry, subjecting the slurry to solid-liquid separation, and then removing the aqueous medium from the second precursor particles in the gaseous atmosphere. As a result, the former method is advantageous in that the hollow particles are less likely to collapse in the hydrocarbon solvent removal step, and the latter method is advantageous in that the amount of the residual hydrocarbon solvent is decreased by bubbling the inert gas.

In the case of substituting the hydrocarbon solvent included in the second precursor particles with water, there is a problem in that obtained hollow resin particles collapse if the same volume of water as the hydrocarbon solvent released from the particles, is not introduced into the particles. For example, a possible means to prevent the problem is thought to be as follows: the pH of the slurry is adjusted to 7 or more; the shell of the particles is swollen with alkali; and then the hydrocarbon solvent is removed from the particles. In this case, the shell of the particles obtains flexibility. Accordingly, the substitution of the hydrocarbon solvent in the interior of the particles with water progresses quickly.

(6) Others

In addition to the steps (1) to (5) mentioned above, the following washing step (6-a) and the following hollow portion re-substitution step (6-b) may be added, for example.

(6-a) Washing Step

The washing step includes carrying out washing by adding acid or alkali, for removal of the dispersion stabilizer remaining in the second precursor composition containing the second precursor particles before the solvent removal step. When the dispersion stabilizer used is an acid-soluble inorganic dispersion stabilizer, washing is preferably carried out by adding acid to the second precursor composition containing the second precursor particles. When the dispersion stabilizer used is an alkali-soluble inorganic compound, washing is preferably carried out by adding alkali to the second precursor composition containing the second precursor particles.

When the acid-soluble inorganic dispersion stabilizer is used as the dispersion stabilizer, the pH of the second precursor composition is preferably controlled to 6.5 or less, and more preferably 6 or less, by adding acid to the second precursor composition containing the second precursor particles. As the added acid, an inorganic acid such as sulfuric acid, hydrochloric acid and nitric acid or an organic acid such as formic acid and acetic acid may be used. Of them, sulfuric acid is particularly preferred, due to its high dispersion stabilizer removal efficiency and small influence on production equipment.

(6-b) Hollow Portion Re-Substitution Step

The hollow portion re-substitution step includes resubstituting the gas or liquid in the interior of the hollow particles with another gas or liquid. By such substitution, the environment of the interior of the hollow particles can be changed; molecules can be selectively confined in the interior of the hollow particles; or the chemical structure of the interior of the hollow particles can be modified in accordance with the intended application thereof.

2. Hollow Particles

The hollow particles obtained by the production method of the present disclosure are less likely to collapse even when they have a high void ratio. This is presumed because the crosslinked structure of the shell is a dense structure. As an index of the dense crosslinked structure of the shell, the hollow particles obtained by the production method of the present disclosure are preferably such hollow particles, that in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 5 by mass of the hollow particles submerge in the acetone. In the immersion test, as the hollow particles that submerge in the acetone decrease, the shell is considered to have a denser structure with less acetone permeability.

The hollow particles obtained by the production method of the present disclosure have a very small number of communication holes and defects in the shell. In SEM observation of the hollow particles, the number of the hollow particles having a communication hole or shell defect can be limited to 5 or less per 100 of the hollow particles.

In general, there are hollow particles in which the shell does not have a communication hole communicating between the hollow portion and the external space of the particles, and hollow particles in which the shell has one or two or more communication holes and the hollow portion communicates with the outside of the particles via the communication holes. In general, depending on the size of the hollow particles, the diameter of the communication hole is approximately from 10 nm to 500 nm. While the communication hole imparts beneficial functions to the hollow particles, since the communication hole is a defect portion of the shell, it decreases the strength of the hollow particles and causes the collapse of the hollow particles.

Also, the hollow particles may have a crack-shaped shell defect which is extremely large relative to the size of the hollow particles. In general, depending on the size of the hollow particles, a crack having a length of 1 µm or more extremely deteriorates the strength of hollow particles. Accordingly, it is recognized as a shell defect.

In the hollow particle immersion test, when less than 5% by mass of the hollow particles submerge in the acetone, the number of the hollow particles having a communication hole or shell defect can be considered to be 5 or less per 100 of the hollow particles. Even when the shell does not have a communication hole or a shell defect, there is a possibility that 5% by mass or more of the hollow particles submerge in the hollow particle immersion test. Accordingly, the case where less than 5% by mass of the hollow particles submerge in the hollow particle immersion test, is considered to mean that the communication holes and shell defects of the shell are very few, and the shell has a dense crosslinked structure.

The shape of the hollow particles obtained by the production method of the present disclosure is not particularly limited, as long as the hollow portion is formed in the interior. As the shape, examples include, but are not limited to, a spherical shape, an ellipsoidal shape and an irregular shape. Among them, a spherical shape is preferable in terms of ease of production.

The hollow particles may have one or two or more hollow portions. The shell of the hollow particles and, when the hollow particles have two or more hollow portions, a partition separating the adjacent hollow portions from each other may be porous. The interior of the particles preferably has only one hollow portion in order to maintain good balance between the high void ratio of the hollow particles and the mechanical strength of the hollow particles.

The average circularity of the hollow particles may be from 0.950 to 0.995.

An example of the image of the shape of the hollow particles is a bag made of a thin film and inflated with gas. A cross-section of the bag is like the hollow particle 100 shown in the diagram (5) of FIG. 1. In this example, one thin film is provided on the outside, and the interior is filled with gas.

The shape of the particles can be determined by SEM or TEM, for example. Further, the shape of the interior of the particles can be determined by SEM or TEM after cutting the particles into round slices by a known method.

The lower limit of the volume average particle diameter of the hollow particles is preferably 4.0 μm or more, more preferably 4.5 μm or more, and still more preferably 5.0 μm or more. On the other hand, the upper limit of the volume average particle diameter of the hollow particles is preferably 60.0 μm or less, more preferably 55.0 μm or less, and still more preferably 50.0 μm or less.

When the volume average particle diameter of the hollow particles is equal to or more than the lower limit value, agreeability of the hollow particles is lowered. Accordingly, excellent dispersibility can be exerted. On the other hand, when the volume average particle diameter of the hollow particles is equal to or less than the upper limit value, the hollow particles are less likely to collapse and obtain high mechanical strength, accordingly.

The particle size distribution (volume average particle diameter (Dv)/number average particle diameter (Dn)) of the hollow particles may be 1.1 or more and 2.5 or less, for example. When the particle size distribution is 2.5 or less, particles which have small variation in compressive strength characteristics and heat resistance between the particles, can be obtained. When the particle size distribution is 2.5 or less, a product having uniform thickness can be produced in the case of producing a molded body in a sheet form, for example.

The volume average particle diameter (Dv) and number average particle diameter (Dn) of the hollow particles can be found as follows, for example. The particle diameter of each of the hollow particles is measured with a laser diffraction particle size distribution measuring apparatus; the number average and volume average of the particle diameters are calculated; and the obtained values can be used as the number average particle diameter (Dn) and volume average particle diameter (Dv) of the particles. The particle size distribution is found by dividing the volume average particle diameter by the number average particle diameter.

The void ratio of the hollow particles obtained by the production method of the present disclosure is 50% or more, and preferably 60% or more. When the void ratio is equal to or more than the lower limit value, the hollow particles obtain excellent lightness in weight, excellent heat resistance and excellent heat insulating properties. The upper limit of the void ratio of the hollow particles of the present disclosure is not particularly limited. From the viewpoint of suppressing a decrease in the strength of the hollow particles and making the hollow particles less likely to collapse, the upper limit is preferably 90% or less, more preferably 85% or less, and still more preferably 80% or less.

The void ratio of the hollow particles obtained by the production method of the present disclosure is calculated from the apparent density $D_1$ and true density $D_0$ of the hollow particles.

A method for measuring the apparent density $D_1$ of the hollow particles is as follows. First, approximately 30 cm³ of the hollow particles are introduced into a measuring flask with a volume of 100 cm³, and the mass of the introduced hollow particles is precisely weighed. Next, the measuring flask in which the hollow particles are introduced, is precisely filled with isopropanol up to the marked line while care is taken so that air bubbles do not get in. The mass of the isopropanol added to the measuring flask is precisely weighed, and the apparent density $D_1$ (g/cm³) of the hollow particles is calculated by the following formula (I).

Apparent density $D_1$=[Mass of the hollow particles]/ (100−[Mass of the isopropanol]/[Specific gravity of the isopropanol at the measuring temperature])      Formula (I)

The apparent density $D_1$ is equivalent to the specific gravity of the whole hollow particle in the case where the hollow portion is regarded as a part of the hollow particle.

A method for measuring the true density $D_0$ of the hollow particles is as follows. The hollow particles are pulverized in advance; approximately 10 g of the pulverized hollow particles are introduced into a measuring flask with a volume of 100 cm³; and the mass of the introduced pulverized particles is precisely weighed. After that, similarly to the measurement of the apparent density mentioned above, isopropanol is added to the measuring flask; the mass of the isopropanol is precisely weighed; and the true density $D_0$ (g/cm³) of the hollow particles is calculated by the following formula (II).

True density $D_0$=[Mass of the pulverized hollow particles]/(100−[Mass of the isopropanol]/[Specific gravity of the isopropanol at the measuring temperature])      Formula (II)

The true density $D_0$ is equivalent to the specific gravity of the shell portion alone of the hollow particle. As is clear from the measurement method mentioned above, when calculating the true density $D_0$, the hollow portion is not regarded as a part of the hollow particle.

The void ratio (%) of the hollow particles is calculated by the following formula (III) where $D_1$ is the apparent density of the hollow particles and $D_0$ is the true density thereof.

Void ratio (%)=100−(Apparent density $D_1$/True density $D_0$)×100      Formula (III)

The void ratio of the hollow particle can be reworded as the ratio occupied by the hollow portion in the specific gravity of the hollow particle.

For the shell thickness of the hollow particles obtained by the production method of the present disclosure, the lower limit is preferably 0.1 μm or more, more preferably 0.2 μm or more, and still more preferably 0.3 μm or more, and the upper limit is preferably 6 μm or less, more preferably 5 μm or less, and still more preferably 4 μm or less. When the thickness of the shell of the hollow particles is equal to or more than the lower limit value, the strength of the shell increases. Meanwhile, the shell of the hollow particles obtained by the production method of the present disclosure has a dense structure. Accordingly, the hollow particles thus obtained are excellent in strength and less likely to collapse even when the shell thickness is equal to or lower than the lower limit value and is thin.

The thickness of the shell of the hollow particles can be calculated as follows. The inner diameter r is calculated by the following formula (1) using the volume average particle diameter R and void ratio of the hollow particles, and the thickness of the shell is calculated by the following formula (2) using the inner diameter r and the volume average particle diameter R. The void ratio in the following formula (1) is a numerical value when expressed in a ratio.

$$4/3\pi \times (R/2)^3 \times \text{Void ratio} = 4/3\pi \times (r/2)^3 \quad \text{Formula (1)}$$

$$\text{Shell thickness} = (R-r)/2 \quad \text{Formula (2)}$$

The difference between the shell thickness calculated as described above and the average value of the actually measured thicknesses of 20 points of the shell, is generally within ±10% of the average value of them. Accordingly, the thickness of the shell calculated as described above can be considered as the thickness of the shell of the hollow particles.

The thickness of each point of the shell of the hollow particles, which is used to obtain the average value of the thicknesses of 20 points of the shell, can be measured by SEM observation of shell fragments obtained by breaking the hollow particles, for example.

The hollow particles obtained by the production method of the present disclosure are less likely to collapse when mixed and kneaded with other materials and even when molded after mixing and kneading with other materials, so that they exert excellent effects as a weight reducing material, a heat insulation material, an acoustic insulation material, a damping material and so on, when they are added to a molded body. Accordingly, the hollow particles of the present disclosure are particularly suitable as an additive for molded body. The hollow particles of the present disclosure are less likely to collapse even when kneaded with a resin and even when molded into a molded body after kneading with a resin. Accordingly, the hollow particles are particularly suitably used as an additive for molded body made of resin.

The molded body containing the hollow particles of the present disclosure may contain, as the resin, thermoplastic or thermosetting resin such as polyethylene, polypropylene, polyvinyl chloride, polystyrene, polyurethane, epoxy resin, acrylonitrile-butadiene-styrene (ABS) resin, acrylonitrile-styrene (AS) resin, poly(meth)acrylate, polycarbonate, polyamide, polyimide, polyphenylene ether, polyphenylene sulfide, polyester and polytetrafluoroethylene. The molded body containing the hollow particles of the present disclosure may further contain organic or inorganic fibers such as carbon fibers, glass fibers, aramid fibers and polyethylene fibers. The hollow particles obtained by the production method of the present disclosure can be contained as a filler in a molded body formed by use of a thermoplastic or thermosetting resin and in a molded body formed by use of a material containing a thermoplastic or thermosetting resin and fibers.

As the applications of the molded body made of a resin containing the hollow particles of the present disclosure, examples include, but are not limited to, members such as a light reflective material, a heat insulation material, a sound insulation material and a low dielectric material, which are used in various kinds of fields such as the automotive field, the electronic field, the electric field, the architecture field, the aviation field and the space field; food containers; footwears such as sports shoes and sandals; components of household appliances; components of bicycles; stationery supplies; and tools.

The hollow particles of the present disclosure have a high void ratio, are less likely to collapse, and have high heat resistance. Accordingly, the hollow particles have heat insulation properties and shock-absorbing properties (cushioning properties) required of an under-coating material, and they also have heat resistance in line with thermal paper uses. Further, the hollow particles of the present disclosure are useful as a plastic pigment that is excellent in gloss, hiding power, etc.

A useful component such as a perfume, a medicine, an agricultural chemical and an ink component can be enclosed in the interior of the hollow particles of the present disclosure by a means such as immersion treatment or depressurized or pressurized immersion treatment. Accordingly, the hollow particles in which such a useful component is enclosed, can be used for various applications in accordance with the component contained in the interior.

EXAMPLES

Hereinbelow, the present disclosure is described more specifically using examples and comparative examples. However, the present disclosure is not limited to these examples. Also, "part(s)" and "%" are on a mass basis unless otherwise specified.

Example 1

(1) Mixture Liquid Preparation Step

First, the following materials were mixed to produce an oil phase.

Ethylene glycol dimethacrylate (80 parts) and pentaerythritol tetraacrylate (20 parts) as the first polymerizable monomer 2,2'-Azobis(2,4-dimethylvaleronitrile) (an oil-soluble polymerization initiator manufactured by Wako Pure Chemical Industries, Ltd., product name: V-65): 3 parts Rosin acid (manufactured by Arakawa Chemical Industries, Ltd., product name: disproportionated rosin RONDIS R-CH, softening point: 150° C. or more, acid value: 150 mgKOH/g to 160 mgKOH/g): 0.007 parts Cyclohexane: 187 parts Next, in a stirring tank, under a room temperature condition, an aqueous solution in which 12.1 parts of sodium hydroxide (an alkali metal hydroxide) was dissolved in 121 parts of ion-exchanged water, was gradually added under stirring to an aqueous solution in which 17.1 parts of magnesium chloride (a water-soluble polyvalent metal salt) was dissolved in 494 parts of ion-exchanged water, thereby preparing a magnesium hydroxide colloidal dispersion (a sparingly water-soluble metal hydroxide colloidal dispersion) (magnesium hydroxide: 4 parts). The obtained dispersion was used as an aqueous phase.

The obtained aqueous phase and oil phase were mixed, thereby preparing a mixture liquid.

(2) Suspension Step

The mixture liquid obtained in the mixture liquid preparation step was stirred with a disperser (product name: HOMO MIXER, manufactured by: PRIMIX Corporation) for one minute at a rotational frequency of 4,000 rpm to be suspended, thereby preparing a suspension in which droplets of a monomer composition including cyclohexane, were dispersed in water.

(3) Polymerization Step

In a nitrogen atmosphere, the temperature of the suspension obtained in the suspension step was increased from 40° C. to 65° C. for 30 minutes (temperature increase rate: 50° C./hour), and then the suspension was stirred for one and a half hours in a temperature condition of 65° C., thereby performing the first polymerization reaction. Accordingly, the first precursor composition containing the first precursor particles, was obtained. The polymerization conversion rate at the point of the end of the first polymerization reaction, was 99.2%, by mass. Then, as the second polymerizable monomer, 5 parts of methyl acrylate was added to the stirring tank, and in a nitrogen atmosphere, they were stirred for two and a half hours in a temperature condition of 65° C., thereby performing the second polymerization reaction. By the second polymerization reaction, the second precursor composition containing the second precursor particles including cyclohexane, was obtained.
(4) Washing Step and Solid-Liquid Separation Step The second precursor composition obtained in the polymerization step was washed with dilute sulfuric acid (25° C., 10 minutes) to bring the pH of the composition to 5.5 or less. Next, water was separated therefrom by filtration. Then, 200 parts of ion-exchanged water was added to the resultant to make a slurry again, and a water washing treatment (washing, filtration and dehydration) was repeatedly performed several times at room temperature (25° C.). The resultant was separated by filtration, thereby obtaining a solid component. The obtained solid component was dried with a dryer at a temperature of 40° C., thereby obtaining the second precursor particles including cyclohexane.
(5) Solvent Removal Step The second precursor particles obtained in the solid-liquid separation step were subjected to heating treatment for 6 hours with a vacuum dryer in a vacuum condition at 200° C., thereby removing the hydrocarbon solvent from the particles. Accordingly, the hollow particles of Example 1 were obtained. From the scanning electron microscopy observation result and void ratio value of the obtained hollow particles, the particles were confirmed to be spherical and to have a hollow portion.

Examples 2 to 5

The hollow particles of Examples 2 to 5 were produced in the same manner as Example 1, except that in the above-mentioned "(3) Polymerization step", the material of the added second polymerizable monomer was changed as shown in Table 1.

Example 6

The hollow particles of Example 6 were produced in the same manner as Example 1, except that in the above-mentioned "(1) Mixture liquid preparation step", the materials of the first polymerizable monomer and their amounts were changed as shown in Table 1.

Examples 7, 8 and 10

The hollow particles of Examples 7, 8 and 10 were produced in the same manner as Example 1, except that in the above-mentioned "(3) Polymerization step", the amount of the methyl acrylate added as the second polymerizable monomer was changed as shown in Table 1.

Example 9

The hollow particles of Example 9 were produced in the same manner as Example 1, except that in the above-mentioned "(1) Mixture liquid preparation step", the rosin acid as the particle diameter control agent was not added.

Comparative Example 1

The hollow particles of Comparative Example 1 were produced in the same manner as Example 1, except that in the above-mentioned "(3) Polymerization step", the second polymerizable monomer was not added, and the second polymerization reaction was not performed.

Comparative Example 2

The hollow particles of Comparative Example 2 were produced in the same manner as Example 1, except that in the above-mentioned "(3) Polymerization step", 5 parts of styrene (having a solubility of 0.2 g/L in distilled water at 20° C.) was added as the second polymerizable monomer, in place of 5 parts of the methyl acrylate.

Comparative Example 3

The hollow particles of Comparative Example 3 were produced in the same manner as Example 1, except that in the above-mentioned "(3) Polymerization step", the reaction time of the first polymerization reaction was changed from 1.5 hours to 30 minutes, and when the polymerization conversion rate of the total of the ethylene glycol dimethacrylate and pentaerythritol tetraacrylate, which were used as the first polymerizable monomer, reached 91.0% by mass the second polymerizable monomer was added and the second polymerization reaction was performed.

Comparative Example 4

The hollow particles of Comparative Example 4 were produced in the same manner as Example 1, except that in the above-mentioned "(1) Mixture liquid preparation step", the materials of the first polymerizable monomer and their amounts were changed as shown in Table 1.

Comparative Example 51

The hollow particles of Comparative Example 5 were produced in the same manner as Example 1, except that in the above-mentioned "(1) Mixture liquid preparation step", the materials of the first polymerizable monomer and their amounts were changed as shown in Table 1, and in the above-mentioned "(3) Polymerization step", the second polymerizable monomer was not added, and the second polymerization reaction was not performed.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| First polymerizable monomer | Non-crosslinkable monomer | Methyl methacrylate (MMA) (Parts) | — | — | — | — | — | — | — | — | — | — |
| | Crosslinkable monomer | Ethylene glycol dimethacrylate (Parts) | 80 | 80 | 80 | 80 | 80 | 100 | 80 | 80 | 80 | 80 |
| | | Pentaerythritol tetraacrylate (Parts) | 20 | 20 | 20 | 20 | 20 | 0 | 20 | 20 | 20 | 20 |

TABLE 1-continued

| | | | | | | | | | | | | |
|---|---|---|---|---|---|---|---|---|---|---|---|---|
| Oil-soluble polymerization initiator (Parts) | | | 3 | 3 | 3 | 3 | 3 | 3 | 3 | 3 | 3 | 3 |
| Hydrocarbon solvent | Cyclohexane (Parts) | | 187 | 187 | 187 | 187 | 187 | 187 | 187 | 187 | 187 | 187 |
| Particle diameter control agent | Rosin acid (Parts) | | 0.007 | 0.007 | 0.007 | 0.007 | 0.007 | 0.007 | 0.007 | 0.007 | 0 | 0.007 |
| Dispersion stabilizer | Magnesium hydroxide (Parts) | | 4 | 4 | 4 | 4 | 4 | 4 | 4 | 4 | 4 | 4 |
| | Ion-exchanged water (Parts) | | 615 | 615 | 615 | 615 | 615 | 615 | 615 | 615 | 615 | 615 |
| Polymerization conversion rate (%) when adding the second polymerizable monomer | | | 99.2 | 99.3 | 99.0 | 99.2 | 99.3 | 99.2 | 99.4 | 99.1 | 98.9 | 98.7 |
| Second Polymerizable monomer | Non-crosslinkable monomer | Methyl acrylate (MA) (Parts) | 5 | | | | | 5 | 3 | 10 | 5 | 13 |
| | | Ethyl acrylate (EA) (Parts) | | 5 | | | | | | | | |
| | | Butyl acrylate (BA) (Parts) | | | 5 | | | | | | | |
| | | Acrylonitrile (AN) (Parts) | | | | 5 | | | | | | |
| | | Methyl methacrylate (MMA) (Parts) | | | | | 5 | | | | | |
| | | Styrene (ST) (Parts) | | | | | | | | | | |
| Solubility (g/L) in distilled water at 20° C. | | | 60 | 15 | 2 | 70 | 16 | 60 | 60 | 60 | 60 | 60 |

| | | | Comparative Example 1 | Comparative Example 2 | Comparative Example 3 | Comparative Example 4 | Comparative Example 5 |
|---|---|---|---|---|---|---|---|
| First polymerizable monomer | Non-crosslinkable monomer | Methyl methacrylate (MMA) (Parts) | — | — | — | 30 | 5 |
| | Crosslinkable monomer | Ethylene glycol dimethacrylate (Parts) | 80 | 80 | 80 | 70 | 80 |
| | | Pentaerythritol tetraacrylate (Parts) | 20 | 20 | 20 | — | 20 |
| Oil-soluble polymerization initiator (Parts) | | | 3 | 3 | 3 | 3 | 3 |
| Hydrocarbon solvent | Cyclohexane (Parts) | | 187 | 187 | 187 | 187 | 187 |
| Particle diameter control agent | Rosin acid (Parts) | | 0.007 | 0.007 | 0.007 | 0.007 | 0.007 |
| Dispersion stabilizer | Magnesium hydroxide (Parts) | | 4 | 4 | 4 | 4 | 4 |
| | Ion-exchanged water (Parts) | | 615 | 615 | 615 | 615 | 615 |
| Polymerization conversion rate (%) when adding the second polymerizable monomer | | | — | 99.5 | 91.0 | 95.3 | — |
| Second Polymerizable monomer | Non-crosslinkable monomer | Methyl acrylate (MA) (Parts) | | | | 5 | 5 |
| | | Ethyl acrylate (EA) (Parts) | | | | | |
| | | Butyl acrylate (BA) (Parts) | | | | | |
| | | Acrylonitrile (AN) (Parts) | | | | | |
| | | Methyl methacrylate (MMA) (Parts) | | | | | |
| | | Styrene (ST) (Parts) | | 5 | | | |
| Solubility (g/L) in distilled water at 20° C. | | | — | 0.2 | 60 | 60 | — |

[Evaluation]

1. Polymerization Conversion Rate

From the first precursor composition produced by the first polymerization reaction in the polymerization step of the examples and comparative examples, 50 g of the first precursor composition was taken and subjected to pressure filtration, thereby obtaining the first precursor particles (containing water and the hydrocarbon solvent) contained in the first precursor composition. The obtained first precursor particles were precisely weighed in milligrams. Next, 27 g of ethyl acetate was added to about 3 g of the precisely weighed first precursor particles, and they were stirred for 15 minutes. Then, 13 g of methanol was added thereto, and they were mixed for 10 minutes. A solution thus obtained was left to stand to deposit an insoluble component, and the supernatant of the solution was collected as a measurement sample. Next, 2 μL of the measurement sample was injected into a gas chromatograph, and the amount of the polymerizable monomer in the measurement sample was quantified by gas chromatography (GC) in the following condition. The quantified amount was regarded as the mass of the unreacted first polymerizable monomer. Also, the first precursor particles obtained by the pressure filtration were dried at 200° C. for two hours for removal of the water and the hydrocarbon solvent, and the mass of the solid component of the first precursor particles was obtained. Then, the polymerization conversion rate was calculated by the following formula (A).

Polymerization conversion rate (% by mass)=100−(Mass of the unreacted first polymerizable monomer/Mass of the solid component of the first precursor particles)×100     Formula (A)

<Condition of GC>
Column: TC-WAX (0.25 mm×30 m)
Column temperature: 80° C.
Injection temperature: 200° C.
FID detection side temperature: 200° C.

For the hollow particles obtained in the examples and the comparative examples, Table 2 shows the content (% by mass) of each monomer unit in the polymer contained in the shell.

The hollow particles obtained in the examples and the comparative examples were measured and evaluated as follows. The results are shown in Table 2.

2. Volume Average Particle Diameter of Hollow Particles

The particle diameter of each hollow particle was measured using a laser diffraction particle size distribution measuring apparatus (product name: SALD-2000, manufactured by: Shimadzu Corporation), and the volume average of the particle diameters was calculated and used as the volume average particle diameter.

3. Density and Void Ratio of Hollow Particles 3-1. Measurement of Apparent Density of Hollow Particles First, approximately 30 cm$^3$ of the hollow particles were introduced into a measuring flask with a volume of 100 cm$^3$, and the mass of the introduced hollow particles was precisely weighed. Next, the measuring flask in which the hollow particles were introduced, was precisely filled with isopropanol up to the marked line while care was taken so that air bubbles did not get in. The mass of the isopropanol added to the measuring flask was precisely weighed, and the apparent density $D_1$ (g/cm$^3$) of the hollow particles was calculated by the following formula (I).

Apparent density $D_1$=[Mass of the hollow particles]/ (100−[Mass of the isopropanol]/[Specific gravity of the isopropanol at the measuring temperature])      Formula (I)

3-2. Measurement of True Density of Hollow Particles

The hollow particles were pulverized in advance; approximately 10 g of the pulverized hollow particles were introduced into a measuring flask with a volume of 100 cm$^3$; and the mass of the introduced pulverized particles was precisely weighed.

Then, similarly to the measurement of the apparent density mentioned above, isopropanol was added to the measuring flask; the mass of the isopropanol was precisely weighed; and the true density $D_0$ (g/cm$^3$) of the hollow particles was calculated by the following formula (II).

True density $D_0$=[Mass of the pulverized hollow particles]/(100−[Mass of the isopropanol]/[Specific gravity of the isopropanol at the measuring temperature])      Formula (II)

3-3. Calculation of Void Ratio

The void ratio of the hollow particles was calculated by the following formula (III) from the apparent density $D_1$ and true density $D_0$ of the hollow particles.

Void ratio (%)=100−(Apparent density $D_1$/True density $D_0$)×100      Formula (III)

4. Shell Thickness of Hollow Particles

The inner diameter r of the hollow particles was calculated by the following formula (1) using the volume average particle diameter R and void ratio of the hollow particles, and the shell thickness of the hollow particles was calculated by the following formula (2) using the inner diameter r and the volume average particle diameter R.

$4/3\pi \times (R/2)^3 \times$ Void ratio=$4/3\eta \times (r/2)^3$      Formula (1)

Shell thickness=$(R-r)/2$      Formula (2)

5. Immersion Test

In an environment at 25° C., 0.1 mg of the hollow particles were added to 4 mL of acetone, and a mixture thus obtained was shaken for 10 minutes at a shaking rate of 100 rpm by use of a shaking device and then left to stand for 48 hours. Then, the ratio of the hollow particles thus submerged was obtained and evaluated according to the following evaluation criteria. The hollow particles submerged in the acetone were separated by a centrifuge, and the separated hollow particles were dried. Then, the mass of the hollow particles submerged in the acetone was measured. The ratio of the mass of the hollow particles submerged in the acetone to the mass of the whole hollow particles immersed in the acetone, was calculated, thereby obtaining the ratio of the hollow particles submerged.

(Evaluation Criteria of the Immersion Test)

○: Less than 5% by mass of the hollow particles submerged.

x: 5% by mass or more of the hollow particles submerged.

6. Residual Monomer Amount

First, 3 g of the hollow particles were precisely weighed in milligrams. Next, 27 g of ethyl acetate was added thereto, and they were stirred for 15 minutes. Then, 13 g of methanol was added thereto, and they were stirred for 10 minutes. A solution thus obtained was left to stand to deposit an insoluble component, and the supernatant of the solution was collected as a measurement sample. Next, 2 μl of the measured sample was injected into a gas chromatograph, and the amount of the unreacted polymerizable monomer in the measurement sample was quantified by gas chromatography (GC) in the following condition. The content of the unreacted polymerizable monomer contained in the hollow particles was calculated and regarded as the residual monomer amount.

<Condition of GC>

Column: TC-WAX (0.25 mm×30 m)

Column temperature: 80° C.

Injection temperature: 200° C.

FID detection side temperature: 200° C.

7. Residual Void Ratio in the Molded Body

First, 10 parts of the hollow particles obtained in any of the above-mentioned examples and comparative examples and, as a thermoplastic resin, 90 parts of polypropylene (manufactured by: Mitsubishi Chemical Corporation, product name: MA1B, specific gravity: 0.90 g/cm$^3$) were mixed by a blender. Next, a resin composition thus obtained was kneaded by a biaxial kneader (product name: TEM-35B, manufactured by: Toshiba Machine Co., Ltd.) in the following kneading condition, extruded and then pelletized, thereby obtaining pellets of the resin composition.

<Kneading Condition>

Screw diameter: 37 mm, L/D=32

Screw rotational frequency: 250 rpm

Resin temperature: 190° C.

Feed rate: 20 kg/h

The obtained pellets of the resin composition were dried by heating at 80° C. for 6 hours. Then, using an injection molding machine, the dried pellets were molded in the following molding condition, thereby obtaining a molded body (size: 80 mm×10 mm×4 mm (thickness)).

<Molding Condition>

Cylinder temperature: 230° C.

Mold temperature: 40° C.

Injection pressure: 70 MPa

The residual void ratio was calculated by the following formula (B) where "a" is the specific gravity of the molded body after injection molding; "b" is the specific gravity (a calculated value) of the molded body with the premise that the void was maintained; and "c" is the specific gravity (a calculated value) of the molded body with the premise that all the hollow particles collapsed.

$$\text{Residual void ratio (\%)} = [1-\{(c-a)/(c-b)\}] \times 100 \quad \text{Formula (B)}$$

The specific gravity of the molded body after the injection molding, was measured by an underwater replacement method in accordance with JIS K 7112.

The specific gravity b of the molded body with the premise that the void was maintained, was calculated by the following formula (C) where $P_A$ is the amount of the added hollow particles; $P_G$ is the specific gravity of the hollow particles; $R_A$ is the amount of the added thermoplastic resin; and $R_G$ is the specific gravity of the thermoplastic resin.

$$b = 1/\{(P_A/P_G)+(R_A/R_G)\} \quad \text{Formula (C)}$$

The specific gravity c of the molded body with the premise that all the hollow particles collapsed, was calculated by the following formula (D) where $R_A$ is the amount of the added thermoplastic resin; $R_G$ is the specific gravity of the thermoplastic resin; $D_0$ is the true density of the hollow particles; $P_A$ is the amount of the added hollow particles; and $P_V$ is the void ratio (%) of the hollow particles.

$$c = [R_G \times R_A + \{D_0 \times P_A \times (1-P_V/100)\}]/\{R_A + P_A \times (1-P_V/100)\} \quad \text{Formula (D)}$$

The meanings of abbreviations shown in Tables 1 and 2 are as follows.

MMA: Methyl methacrylate
MA: Methyl acrylate
EA: Ethyl acrylate
BA: Butyl acrylate
AN: Acrylonitrile
ST: Styrene

[Consideration]

As shown in Table 2, the hollow particles obtained in the comparative examples had a high void ratio of 65%; however, the residual void ratio of the molded body of the resin composition in which the hollow particles were contained, was low. Accordingly, it was revealed that the hollow particles were likely to collapse.

In Comparative Example 1, the second polymerizable monomer was not added. Accordingly, the residual monomer amount contained in the obtained hollow particles was large, and 5% by mass or more of the hollow particles submerged in the acetone in the hollow particle immersion

TABLE 2

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Crosslinkable monomer unit (% by mass) | Ethylene glycol dimethacrylate | 76.2 | 76.2 | 76.2 | 76.2 | 76.2 | 95.2 | 77.7 | 72.7 | 76.2 | 70.8 |
| | Pentaerythritol tetraacrylate | 19.0 | 19.0 | 19.0 | 19.0 | 19.0 | 0.0 | 19.4 | 18.2 | 19.0 | 17.7 |
| Non-crosslinkable monomer unit (% by mass) | MA | 4.8 | | | | | 4.8 | 2.9 | 9.1 | 4.8 | 11.5 |
| | EA | | 4.8 | | | | | | | | |
| | BA | | | 4.8 | | | | | | | |
| | AN | | | | 4.8 | | | | | | |
| | MMA | | | | | 4.8 | | | | | |
| | ST | | | | | | | | | | |
| Properties of hollow particles | Volume average particle diameter (μm) | 9.5 | 9.2 | 9.0 | 8.7 | 9.6 | 9.8 | 9.5 | 9.4 | 18.2 | 9.2 |
| | Apparent density $D_1$ (g/cm³) | 0.42 | 0.42 | 0.42 | 0.42 | 0.42 | 0.42 | 0.42 | 0.42 | 0.42 | 0.42 |
| | True density $D_0$ (g/cm³) | 1.20 | 1.20 | 1.20 | 1.20 | 1.20 | 1.20 | 1.20 | 1.20 | 1.20 | 1.20 |
| | Void ratio (%) | 65 | 65 | 65 | 65 | 65 | 65 | 65 | 65 | 65 | 65 |
| | Shell thickness (μm) | 0.64 | 0.62 | 0.60 | 0.58 | 0.64 | 0.66 | 0.64 | 0.63 | 1.22 | 0.62 |
| | Immersion test | ○ | ○ | ○ | ○ | ○ | ○ | ○ | ○ | ○ | ○ |
| | Residual monomer amount (ppm) | 15 | 187 | 216 | 13 | 731 | 51 | 30 | 12 | 17 | 10 |
| | Residual void ratio (%) | 99.5 | 98.5 | 98.2 | 99.3 | 96.2 | 92.5 | 93.5 | 99.6 | 99.3 | 91.2 |

| | | Comparative Example 1 | Comparative Example 2 | Comparative Example 3 | Comparative Example 4 | Comparative Example 5 |
|---|---|---|---|---|---|---|
| Crosslinkable monomer unit (% by mass) | Ethylene glycol dimethacrylate | 80.0 | 76.2 | 76.2 | 66.6 | 76.2 |
| | Pentaerythritol tetraacrylate | 20.0 | 19.0 | 19.0 | | 19.0 |
| Non-crosslinkable monomer unit (% by mass) | MA | | | 4.8 | 4.8 | |
| | EA | | | | | |
| | BA | | | | | |
| | AN | | | | | |
| | MMA | | | | 28.6 | 4.8 |
| | ST | | 4.8 | | | |
| Properties of hollow particles | Volume average particle diameter (μm) | 9.2 | 9.5 | 9.3 | 9.0 | 9.6 |
| | Apparent density $D_1$ (g/cm³) | 0.42 | 0.42 | 0.42 | 0.42 | 0.42 |
| | True density $D_0$ (g/cm³) | 1.20 | 1.20 | 1.20 | 1.20 | 1.20 |
| | Void ratio (%) | 65 | 65 | 65 | 65 | 65 |
| | Shell thickness (μm) | 0.62 | 0.64 | 0.62 | 0.60 | 0.64 |
| | Immersion test | x | x | x | x | x |
| | Residual monomer amount (ppm) | 990 | 952 | 787 | 879 | 962 |
| | Residual void ratio (%) | 78.2 | 80.1 | 80.6 | 54.2 | 76.2 | test. The reason why acetone was likely to permeate the obtained hollow particles and the obtained hollow particles were likely to collapse in Comparative Example 1, is presumed that unreacted polymerizable functional groups remained in the shell and the crosslinked structure of the shell was loose because the polymerization reaction was performed in one stage.

In Comparative Example 2, as the second polymerizable monomer, styrene having a solubility of 0.2 g/L in distilled water at 20° C., was used in place of the hydrophilic monomer having a solubility of 0.3 g/L or more in distilled water at 20° C. Accordingly, the residual monomer amount contained in the obtained hollow particles was large, and 5% by mass or more of the hollow particles submerged in the acetone in the hollow particle immersion test. The reason why acetone was likely to permeate the obtained hollow particles and the obtained hollow particles were likely to collapse in Comparative Example 2, is presumed that unreacted polymerizable functional groups remained in the shell and the crosslinked structure of the shell was loose because the second polymerizable monomer was poorly incorporated in the shell.

In Comparative Example 3, the second polymerizable monomer was added before the polymerization conversion rate of the first polymerizable monomer reached 931 by mass. Accordingly, the residual monomer amount contained in the obtained hollow particles was large, and 5% by mass or more of the hollow particles submerged in the acetone in the hollow particle immersion test. The reason why acetone was likely to permeate the obtained hollow particles and the obtained hollow particles were likely to collapse in Comparative Example 3, is presumed that unreacted polymerizable functional groups remained in the shell and the crosslinked structure of the shell was loose because the second polymerizable monomer was added too early.

In Comparative Example 4, the content of the crosslinkable monomer in 100 parts by mass of the first polymerizable monomer was less than 75 parts by mass. Accordingly, the residual monomer amount contained in the obtained hollow particles was large, and 5, by mass or more of the hollow particles submerged in the acetone in the hollow particle immersion test. The reason why acetone was likely to permeate the obtained hollow particles and the obtained hollow particles were likely to collapse, in Comparative Example 4, is presumed that the crosslinked structure of the shell was loose because the content of the crosslinkable monomer in the first polymerizable monomer was small and the amount of the non-crosslinkable monomer remaining unreacted was large.

In Comparative Example 5, methyl methacrylate was added to the mixture liquid in one stage, in combination with the first polymerizable monomer and not as the second polymerizable monomer. Accordingly, the residual monomer amount contained in the obtained hollow particles was large, and 5% by mass or more of the hollow particles submerged in the acetone in the hollow particle immersion test. The reason why acetone was likely to permeate the obtained hollow particles and the obtained hollow particles were likely to collapse in Comparative Example 5, is presumed that unreacted polymerizable functional groups remained in the shell and the crosslinked structure of the shell was loose because the polymerization reaction was performed in one stage.

Meanwhile, the hollow particles obtained in the examples had a high void ratio of 65%, and the molded body of the resin composition containing the hollow particles had a high residual void ratio. It was revealed that the hollow particles were less likely to collapse while having a high void ratio.

In Examples 1 to 10, 75 parts by mass to 100 parts by mass of the crosslinkable monomer was contained in 100 parts by mass of the first polymerizable monomer contained in the mixture liquid, and in the polymerization step, when the polymerization conversion rate of the first polymerizable monomer reached 93, by mass or more, the second polymerizable monomer having a solubility of 0.3 g/L or more in distilled water at 20° C., was added to the suspension and further subjected to the polymerization reaction. Accordingly, almost no polymerizable monomer remained unreacted in the obtained hollow particles, and less than 5% by mass of the hollow particles submerged in the acetone in the hollow particle immersion test. The reason why the hollow particles through which acetone is less likely to permeate and which are less likely to collapse even though they have a high void ratio, were obtained in Examples 1 to 10, is presumed that almost no polymerizable functional groups remained unreacted in the shell even though a large amount of the crosslinkable monomer was used, and the crosslinked structure of the shell was densified.

REFERENCE SIGNS LIST

1. Aqueous medium
2. Low polarity material
3. Dispersion stabilizer
4. Monomer composition
4a. Hydrocarbon solvent
4b. Material not containing hydrocarbon solvent
4c. Polymerizable monomer dispersed in aqueous medium
5. Oil-soluble polymerization initiator
6. Shell
8. Hollow portion
10. Droplet
20. Hollow particle including hydrocarbon solvent in the hollow portion (the second precursor particle)
100. Hollow particle having a hollow portion filled with gas

The invention claimed is:

1. A method for producing hollow particles which comprise a shell containing a resin and a hollow portion surrounded by the shell and which have a void ratio of 50% or more, the method comprising:
preparing a mixture liquid containing a first polymerizable monomer, a hydrocarbon solvent, a dispersion stabilizer and an aqueous medium,
suspending the mixture liquid to prepare a suspension in which droplets of a monomer composition containing the first polymerizable monomer and the hydrocarbon solvent are dispersed in the aqueous medium, and
subjecting the suspension to a polymerization reaction,
wherein the mixture liquid contains a crosslinkable monomer as the first polymerizable monomer, and in 100 parts by mass of the first polymerizable monomer, a content of the crosslinkable monomer is from 75 parts by mass to 100 parts by mass, and
wherein, during the polymerization reaction of the suspension, when a polymerization conversion rate of the first polymerizable monomer reaches 93% by mass or more, a second polymerizable monomer having a solubility of 0.3 g/L or more in distilled water at 20° C., is added to the suspension and further subjected to the polymerization reaction.

2. The method for producing the hollow particles according to claim 1, wherein, during the polymerization reaction of the suspension, an amount of the second polymerizable monomer added is from 3 parts by mass to 15 parts by mass, with respect to 100 parts by mass of the first polymerizable monomer.

3. The method for producing the hollow particles according to claim 1, wherein the first polymerizable monomer contains, as the crosslinkable monomer, a bifunctional crosslinkable monomer and a trifunctional or higher-functional crosslinkable monomer.

4. The method for producing the hollow particles according to claim 1,
wherein the first polymerizable monomer contains, as the crosslinkable monomer, a trifunctional or higher-functional crosslinkable monomer having three or more polymerizable functional groups, and
wherein, in 100 parts by mass of the first polymerizable monomer, a content of the trifunctional or higher-functional crosslinkable monomer is from 5 parts by mass to 50 parts by mass.

5. The method for producing the hollow particles according to claim 1, wherein the first polymerizable monomer contains, as the crosslinkable monomer, at least one bifunctional crosslinkable monomer selected from the group consisting of divinylbenzene, ethylene glycol di(meth)acrylate and pentaerythritol di(meth)acrylate.

6. The method for producing the hollow particles according to claim 1, wherein the first polymerizable monomer contains, as the crosslinkable monomer, at least one trifunctional or higher-functional crosslinkable monomer selected from the group consisting of pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate and dipentaerythritol poly(meth)acrylate.

7. The method for producing the hollow particles according to claim 1, wherein the mixture liquid contains at least one selected from the group consisting of rosin acids, higher fatty acids and metal salts thereof.

8. The method for producing the hollow particles according to claim 1, wherein the dispersion stabilizer is an inorganic dispersion stabilizer.

9. The method for producing the hollow particles according to claim 8, wherein the inorganic dispersion stabilizer is a sparingly water-soluble metal salt.

10. The method for producing the hollow particles according to claim 1, wherein the hollow particles are such hollow particles, that in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 5% by mass of the hollow particles submerge in the acetone.

* * * * *